United States Patent [19]

Yamada et al.

[11] Patent Number: 5,684,729
[45] Date of Patent: Nov. 4, 1997

[54] FLOATING-POINT ADDITION/ SUBSTRACTION PROCESSING APPARATUS AND METHOD THEREOF

[75] Inventors: Hiromichi Yamada; Fumio Murabayashi, both of Hadano; Tatsumi Yamauchi, Hitachioota; Takashi Hotta, Hitachi; Hideo Sawamoto, Machida; Takahiro Nishiyama, Sagamihara; Yoshikazu Kiyoshige; Noriyasu Ido, both of Hadano, all of Japan

[73] Assignee: Hitachi, Ltd., Tokyo, Japan

[21] Appl. No.: 530,471

[22] Filed: Sep. 19, 1995

[30] Foreign Application Priority Data

Sep. 19, 1994 [JP] Japan .................................. 6-222950
Jan. 24, 1995 [JP] Japan .................................. 7-009213

[51] Int. Cl.⁶ .................................................. G06F 7/50
[52] U.S. Cl. ...................................... 364/748; 364/715.04
[58] Field of Search ............................. 364/748, 715.04

[56] References Cited

U.S. PATENT DOCUMENTS

| | | | |
|---|---|---|---|
| 4,926,369 | 5/1990 | Hokenek et al. | 364/748 |
| 5,247,471 | 9/1993 | Hilker et al. | 364/748 |
| 5,282,156 | 1/1994 | Miyoshi et al. | 364/748 |
| 5,317,527 | 5/1994 | Britton et al. | 364/715.04 |
| 5,343,413 | 8/1994 | Inoue | 364/715.04 |
| 5,373,461 | 12/1994 | Bearden et al. | 364/748 |
| 5,568,412 | 10/1996 | Han et al. | 364/748 |

FOREIGN PATENT DOCUMENTS

| | | |
|---|---|---|
| 2233723 | 9/1990 | Japan . |
| 6044048 | 2/1994 | Japan . |

*Primary Examiner*—David H. Malzahn
*Attorney, Agent, or Firm*—Antonelli, Terry, Stout & Kraus, LLP.

[57] ABSTRACT

To offer a floating-point addition/subtraction processing apparatus and a method thereof, capable of shortening the computation time, the floating-point calculation processing apparatus includes an approximate shift mount predicting unit for predicting a shift amount for normalization by using the input floating-point data to be addition/subtraction processed within an error of 1 bit, a shift error detecting unit for detecting a difference between the predicted shift amount and a correct shift amount, and an bit shifter for correcting a result, obtained by normalization using the predicted shift amount, by the detected difference of the two shift amounts, wherein a round-off determination and a shift amount calculation are processed in parallel before a normalization shift processing is executed.

15 Claims, 27 Drawing Sheets

FIG. 16

| No. | Operation Condition - Calculation | Digit Adjustment | Calculation Result | Normalization | Rounding |
|---|---|---|---|---|---|
| 1 | EFFECTIVE ADDITION | ARBITRARY | 1☐. [digit length of data format] ~ OVER | LOWER DIRECTION BY 1 DIGIT | NECESSARY |
| 2 | EFFECTIVE ADDITION | ARBITRARY | 1. [digit length of data format] ~ OVER | 0 | NECESSARY |
| 3 | EFFECTIVE SUBTRACTION | NOT LESS THAN 2 DIGITS | 1. [digit length of data format] ~ OVER | 0 | NECESSARY |
| 4 | EFFECTIVE SUBTRACTION | NOT LESS THAN 2 DIGITS | 0.1 [digit length of data format] ~ OVER | UPPER DIRECTION BY 1 DIGIT | NECESSARY |
| 5 | EFFECTIVE SUBTRACTION | 0, 1 DIGIT | 0.0 [digit length of data format] | UPPER DIRECTION BY NOT LESS THAN 2 DIGITS | UNNECESSARY |

FIG. 17

| No. | Operation Condition - Calculation | Operation Condition - Digit Adjustment | Calculation Result | Normalization | Rounding |
|---|---|---|---|---|---|
| 1 | Effective Addition | Arbitrary | 1.▮▮▮▮ ~OVER, Digit length of data format | 0 | Necessary |
| 2 | Effective Subtraction | Not less than 2 digits | 0.1▮▮▮ ~OVER, Digit length of data format | Upper direction by 1 digit | Necessary |
| 3 |  | 0, 1 digit | 0.0▯▯▯ Digit length of data format | Upper direction by not less than 2 digits | Unnecessary |

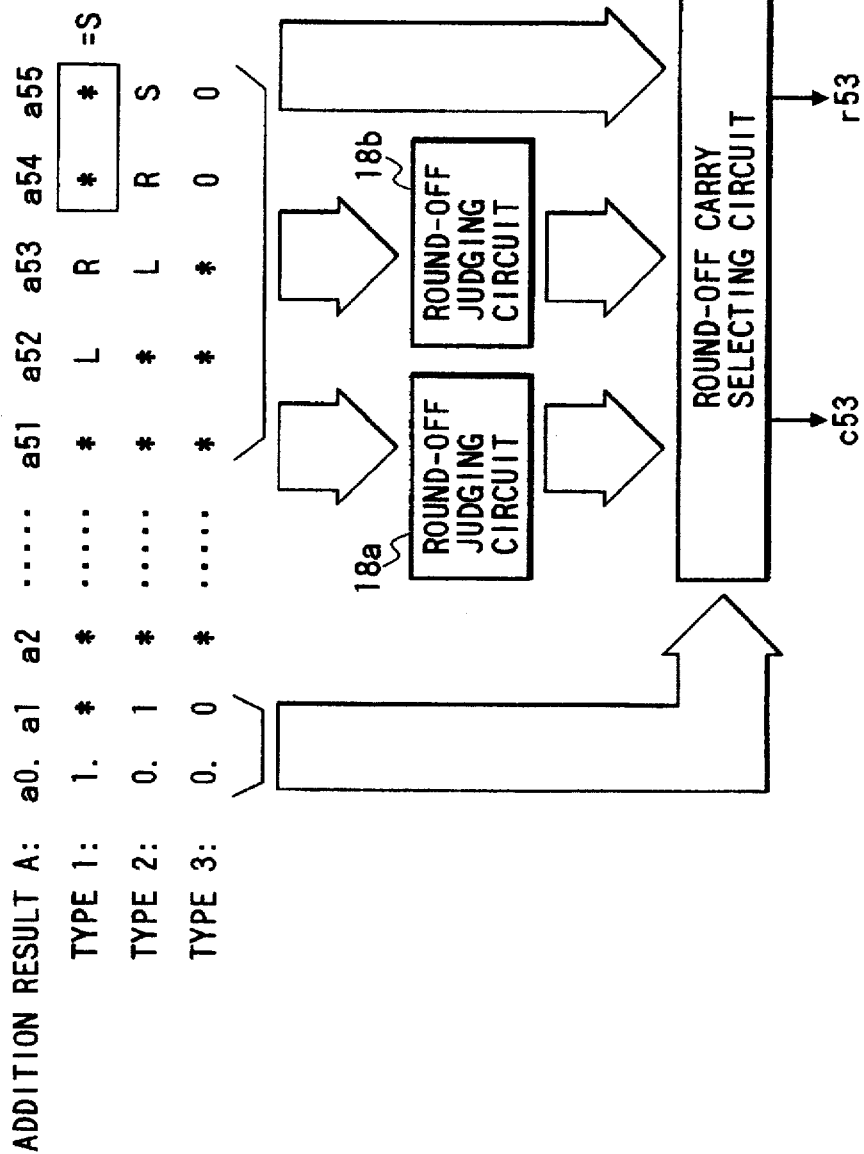

FIG. 20

(1) EFFECTIVE ADDITION BY ADDER/SUBTRACTER $$
\begin{array}{rlllllll}
M: & m0 & m1 & m2 \cdots & m52 & m53 & 0 & 0 \\
N: & n0 & n1 & n2 \cdots & n52 & n53 & n54 & n55 \\
+) & & & & & & & \\ \hline
\text{RESULT} \quad A: & a0 & a1 & a2 \cdots & a52 & a53 & a54 & a55
\end{array}
$$

(2) EFFECTIVE SUBTRACTION BY ADDER/SUBTRACTER $$
\begin{array}{rllllllll}
M: & & m0 & m1 & m2 \cdots & m52 & m53 & 0 & 0 \\
N: & 1 & \overline{n0} & \overline{n1} & \overline{n2} \cdots & \overline{n52} & \overline{n53} & \overline{n54} & \overline{n55} \\
+) & & & & & & & & 1 \\ \hline
\text{RESULT} \quad A: & & a0 & a1 & a2 \cdots & a52 & a53 & a54 & a55
\end{array}
$$

(3) EFFECTIVE ADDITION BY INCREMENT CIRCUIT $$
\begin{array}{rlllllll}
M: & m0 & m1 & m2 \cdots & m52 & m53 & 0 & 0 \\
N: & n0 & n1 & n2 \cdots & n52 & n53 & n54 & n55 \\
+) & & & & & & & 1 \\ \hline
\text{RESULT} \quad I: & iv & i0 & i1 & i2 \cdots & & & i52
\end{array}
$$

(4) EFFECTIVE SUBTRACTION BY INCREMENT CIRCUIT $$
\begin{array}{rllllllll}
M: & & m0 & m1 & m2 \cdots & m52 & m53 & 0 & 0 \\
N: & 1 & \overline{n0} & \overline{n1} & \overline{n2} \cdots & \overline{n52} & \overline{n53} & \overline{n54} & \overline{n55} \\
+) & & & & & & & 1 & 1 \\ \hline
\text{RESULT} \quad I: & & iv & i0 & i1 & i2 \cdots & & & i52
\end{array}
$$

FIG. 21

(1) NORMALIZATION SHIFT OF ADDITION/SUBTRACTION RESULT

| SHIFT AMOUNT | RESULT OF NORMALIZATION SHIFT J | | | | | | | |
|---|---|---|---|---|---|---|---|---|
| | jv | j0 | j1 | j2 | j3···j48 | j49 | j50 | j51 |
| 0 | 0 | a0 | a1 | a2 | a3···a48 | a49 | a50 | a51 |
| 1 | a0 | a1 | a2 | a3 | a4···a49 | a50 | a51 | a52 |
| 2 | a1 | a2 | a3 | a4 | a5···a50 | a51 | a52 | a53 |
| 3 | a2 | a3 | a4 | a5 | a6···a51 | a52 | a53 | 0 |
| ... | ... | ... | ... | ... | ... | ... | ... | ... |
| 52 | a51 | a52 | a53 | 0 | 0···0 | 0 | 0 | 0 |
| 53 | a52 | a53 | 0 | 0 | 0···0 | 0 | 0 | 0 |

(2) NORMALIZATION SHIFT OF INCREMENT OPERATION RESULT

| SHIFT AMOUNT | RESULT OF NORMALIZATION SHIFT K | | | | | | | |
|---|---|---|---|---|---|---|---|---|
| | kv | k0 | k1 | k2 | k3···k48 | k49 | k50 | k51 |
| 0 | iv | i0 | i1 | i2 | i3···i48 | i49 | i50 | i51 |
| NOT LESS THAN 1 | i0 | i1 | i2 | i3 | i4···i49 | i50 | i51 | i52 |

FIG. 22
(1) CRITICAL PATH OF ADDITION/SUBTRACTION AND NORMALIZATION SHIFT IN CONVENTIONAL PROCESSOR
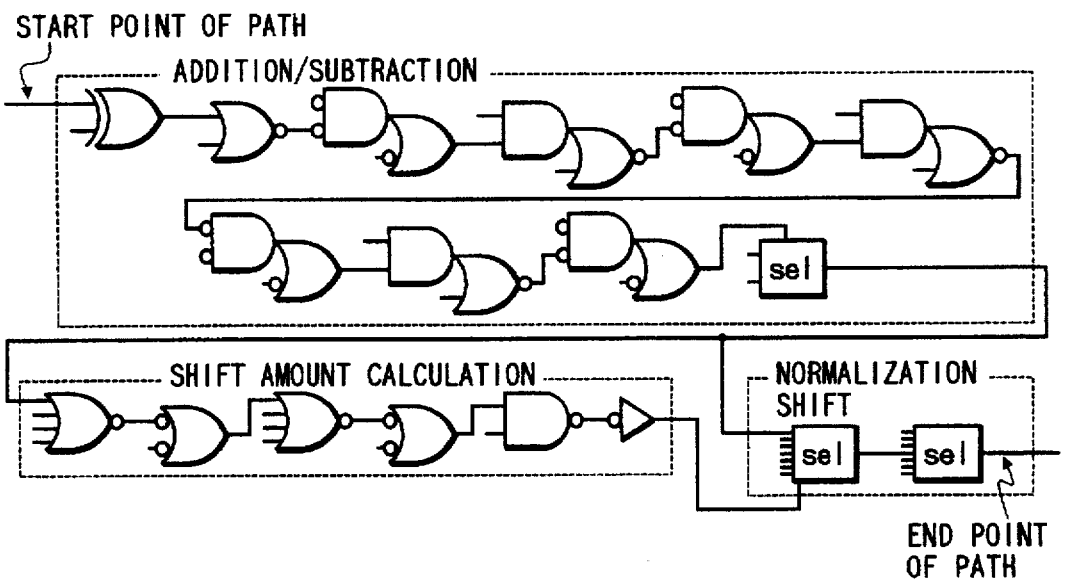
(2) CRITICAL PATH OF ADDITION/SUBTRACTION AND NORMALIZATION SHIFT IN PROCESSOR OF PRESENT INVENTION
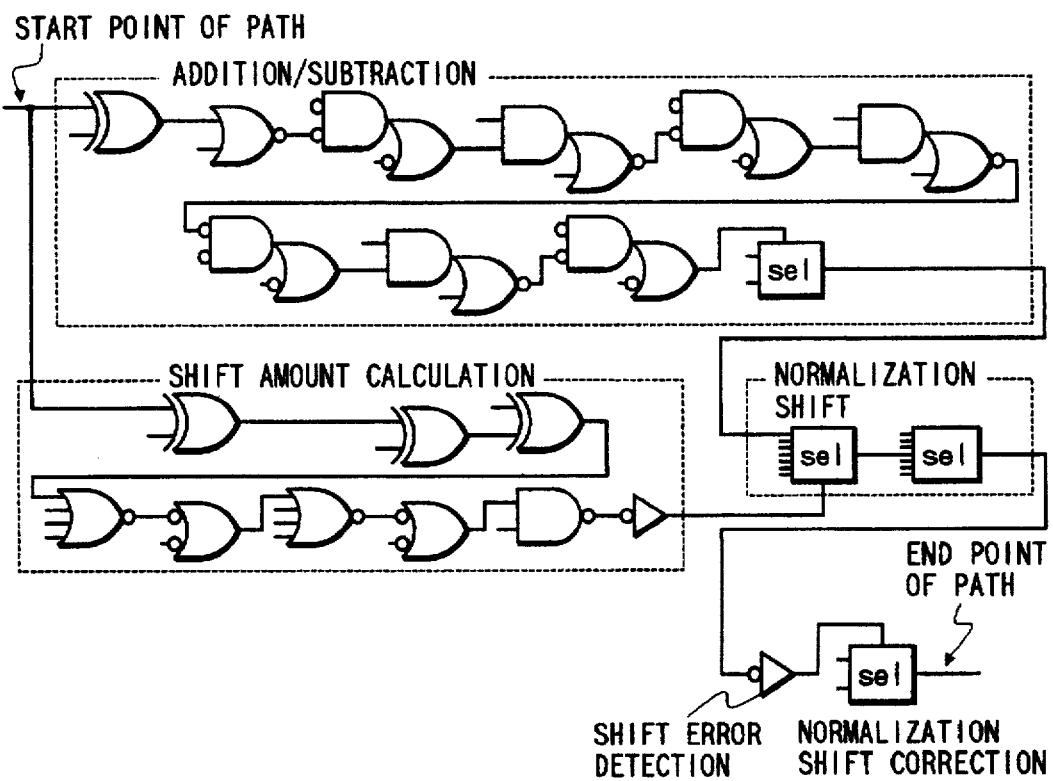

FIG. 25 - TABLE 1

| OUTPUT OF DIGIT ADJUSTING CIRCUIT | $e_1 \geq e_2$ | $e_1 < e_2$ |
|---|---|---|
| EXPONENT PART $e_c$(103) | $e_1$ | $e_2$ |
| MANTISSA PART $f_a$(104) | $1.f_1$ | $1.f_2$ |
| MANTISSA PART $f_b$(105) | SHIFTING ($1.f_2$) BY DIFFERENCE($e_1-e_2$) TO LOWER DIRECTION, THEN, VALUE OF 55TH BIT OF DECIMAL NUMBER PART($b_{55}$) IS RESULT OF OR OPERATION OF ALL BITS NOT MORE THAN 55TH BIT | SHIFTING ($1.f_1$) BY DIFFERENCE($e_2-e_1$) TO LOWER DIRECTION, THEN, VALUE OF 55TH BIT OF DECIMAL NUMBER PART($b_{55}$) IS RESULT OF OR OPERATION OF ALL BITS NOT MORE THAN 55TH BIT |

FIG. 26 - TABLE 2

| KIND OF OPERATION | OPERATION CONTROL (101) | | | CONDITION |
|---|---|---|---|---|
| | 101a | 101b | 101c | |
| EFFECTIVE ADDITION ($f_a + f_b$) | 0 | 0 | 0 | OPERATION=ADDITION AND $s_1 = s_2$ OR OPERATION=SUBTRACTION AND $s_1 \neq s_2$ |
| EFFECTIVE SUBTRACTION A ($f_a - f_b$) | 0 | 1 | 1 | OPERATION=ADDITION AND $s_1 \neq s_2$ OR OPERATION=SUBTRACTION AND $s_1 = s_2$ EXCEPT $\{(e_1 = e_2) \text{ AND } (f_1 < f_2)\}$ |
| EFFECTIVE SUBTRACTION B ($f_b - f_a$) | 1 | 0 | 1 | OPERATION=ADDITION AND $s_1 \neq s_2$ OR OPERATION=SUBTRACTION AND $s_1 = s_2$ $(e_1 = e_2) \text{ AND } (f_1 < f_2)$ |

FIG. 27-TABLE 3

| NAME OF BLOCK | NAME OF SIGNAL | VALUE OF SIGNAL |
|---|---|---|
| OPERAND SWAP CIRCUIT 10 | 104 | 01. 0011··· |
| DIGIT ADJUSTING SHIFTER 11 | 105 | 00. 0100··· |
| OPERATION CONTROL CIRCUIT 24 | 101 (101a~c) | 011 |
| ADDER/ SUBTRACTER 12 (SHIFT AMOUNT PREDICTING CIRCUIT 13) | 120 (130) | 01. 0011··· |
| | 121 (131) | 11. 1011··· |
| ADDER/ SUBTRACTER 12 | 106 | 00. 111··· |
| SHIFT AMOUNT PREDICTING CIRCUIT 13 | 132 | 01110··· |
| | 147 | 1000000 (=0) |
| | 148 | 01000000 (=1) |
| SHIFTER FOR NORMALIZATION 14 | 108 | 01. 11··· |

FIG. 28 - TABLE 4

| NAME OF BLOCK | NAME OF SIGNAL | VALUE OF SIGNAL |
|---|---|---|
| OPERAND SWAP CIRCUIT 10 | 104 | 01. 1011··· |
| DIGIT ADJUSTING SHIFTER 11 | 105 | 00. 0100··· |
| OPERATION CONTROL CIRCUIT 24 | 101 (101a~c) | 011 |
| ADDER/ SUBTRACTER 12 (SHIFT AMOUNT PREDICTING CIRCUIT 13) | 120 (130) | 01. 1011··· |
| | 121 (131) | 11. 1011··· |
| ADDER/ SUBTRACTER 12 | 106 | 01. 011··· |
| SHIFT AMOUNT PREDICTING CIRCUIT 13 | 132 | 01011··· |
| | 147 | 1000000 (=0) |
| | 148 | 01000000 (=1) |
| SHIFTER FOR NORMALIZATION 14 | 108 | 10. 11··· |

FLOATING-POINT ADDITION/ SUBSTRACTION PROCESSING APPARATUS AND METHOD THEREOF

BACKGROUND OF THE INVENTION

The present invention relates to an addition/subtraction apparatus for a floating-point addition/subtraction which requires round-off processing and normalization processing, for example, as applied to a, including a floating-point operation function, a LSI such as a floating-point operation chip, and a data processing apparatus or a system using such chips.

As a method of expressing a floating-point number in a computer, a standard format determined by IEEE-754 is usually used. A floating-point number expressed by using sign s, exponent part e and decimal number part f is represented as follows:

$$(-1)^s \times 2^{(e-b)} \times (1.f) \qquad (1),$$

where b is referred to as an exponent bias and its value is approximately a half of the maximum value of the exponent e. Then, an integer 1 is added to the decimal number part f, and the integer part connected with the decimal number part is referred to as a mantissa part. The above-expressed number is called as a normalized number.

In the above expressions the symbol denotes a power, for example, $2^{(e-b)}$ means raising 2 to the (e-b)th power. Any value except the mantissa part is expressed by a decimal notation so long as a a notice is not especially mentioned.

An example of a conventional method of executing such a floating-point operation as mentioned above is described in Japanese Patent Application Laid-Open No.232723/1990.

However, in the conventional processor, since a bit shift amount for normalization is calculated by using the obtained results of addition/subtraction, the normalization processing takes a significant time, which prevents high-speed computation.

Further, in the conventional processor, the shift amount calculation and a round-off determination which need much computing time, are carried out sequentially since the round-off determination is executed after the normalization shift, which lengthens the computing time.

And further, U.S. Pat. No. 4,926,369 discloses a method using a prediction algorithm for predicting the shift amount adjustment by use of carry, and U.S. Pat. No. 5,282,156 discloses a method of predicting the shift amount by generating a redundant binary number using simple XOR and OR signals. However, in those methods, algorithmic calculation steps are merely mentioned, but a concrete structure, components or cooperations between the components needed to form a computing apparatus, for realizing such an algorithm, are not disclosed in these patents.

SUMMARY OF THE INVENTION

The first object of the present invention is to offer a computation apparatus and a method thereof which are capable of executing a normalization processing at high speed.

The second object of the present invention is to offer the floating-point addition/subtraction processing apparatus and a method thereof, which are capable of shortening a computation time by processing is carried out a round-off determination and a shift amount calculation in parallel before a normalization shift processing.

To realize the above objects, the present invention has the following features.

The first feature is that a processing apparatus comprises an approximate shift amount predicting unit for predicting a shift amount for normalization by using input data for addition/subtraction within a error of n bits, a shift error detecting unit for detecting a difference between the predicted shift amount and a correct shift amount, and a n bit shifter for shifting a result obtained by normalization using the predicted shift amount, by the detected difference between the two shift amounts.

And, the processing apparatus by the present invention has advantageous features in that the apparatus comprises:

a pre-shifter for shifting two mantissas of two floating-point number operands by one digit in a lower direction if an effective addition is executed, the one digit shift being not executed if an effective subtraction is executed;

an adder/subtracter for adjusting a digit of the two mantissas of the floating-point number operands output from the pre-shifter, and for calculating addition/subtraction;

a first round-off judging circuit for determining generation of a carry due to a round-off operation by using data of the digits lower than the minimum digit of a predetermined data format, to a result of said addition/subtraction, and for outputting information on generation of a carry;

a second round-off judging circuit for determining a generation of a carry due to a round-off operation by using data of further lower digits from 1 digit than said minimum digit, to a result of said addition/subtraction, and for outputting information on generation of a carry;

a round-off carry selecting circuit for detecting a digit having a value 1 in an upper position in a result of addition/subtraction, for selecting and outputting an output from said first round-off judging circuit if the digit having a value 1 exists at a first digit of an integer part, and for selecting and output an outputting from said second round-off judging circuit; a normalization circuit for normalizing a result of said addition/subtraction; and a rounding circuit for rounding a result of said addition/subtraction corresponding to said output from one of said first round-off judging circuit and said round-off carry selecting circuit.

The second feature is that a processing method of addition/subtraction, comprises the steps of:

shifting the two mantissas of floating-point operands by 1 digit in the lower direction if effective addition is executed;

adding the two shifted mantissas after the digit adjustment of the two shifted mantissa is carried out if effective addition is executed;

judging carry generation by using the first data group of data existing in the lower digits from the minimum digit of a predetermined format and the second data group existing in the lower digits from the digit and lower by 1 digit than the minimum digit and rounding and normalizing the obtained addition result by using the first data group if the digit having a 1 value is at the first digit position of the integer part, and by using the second data group if the digit having a 1 value is at the first digit position of the decimal number part.

BRIEF DESCRIPTION OF THE DRAWINGS

FIG. 16 is a table for explaining the relation between the normalization shift amount and the round-off.

FIG. 17 is a table for explaining the relation between the normalization shift amount obtained by using the present invention and the round-off.

FIG. 18 is a diagram for explaining a round-off judging method and a round-off selecting method, according to the present invention.

FIG. 20 is a diagram showing data processing of the adder/subtracter 12 and the increment circuit 21 shown FIG. 19.

FIG. 21 is a table showing data processing of the shifters for normalization 14A and 14B shown FIG. 19.

FIG. 22 is a logic diagram for comparing respective operation critical paths of the floating-point adder between a conventional apparatus and the embodiment of the present invention.

FIGS. 25-28 are illustrations of Table 1 through Table 4, respectively.

DETAILED DESCRIPTION OF THE EMBODIMENTS

Figure 1:
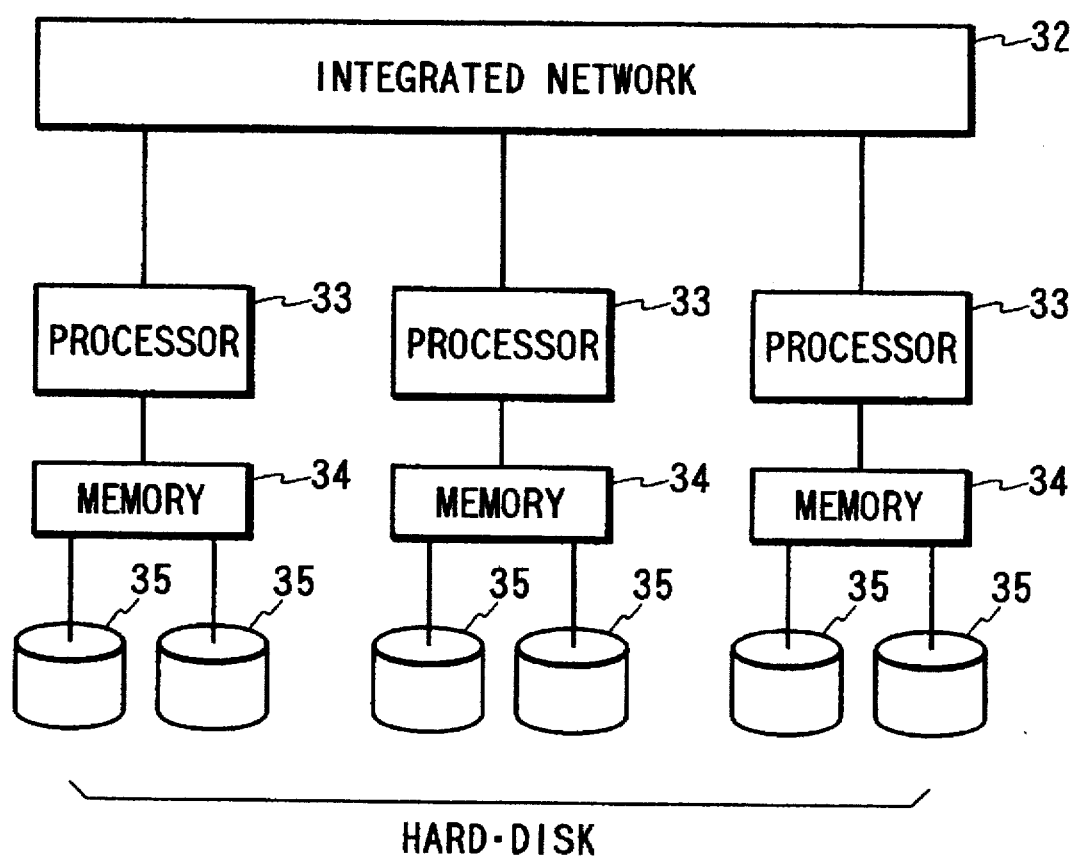
FIG. 1 is a block diagram showing an example of a computer system using the present invention.

As to floating-point calculation, a general calculation method will be explained in the following.

As a method of expressing a floating-point number in a computer, a standard format determined by IEEE-754 is usually used. A floating-point number expressed by using sign s, exponent part e and decimal number part f is represented as follows.

$$(-1)^s \times 2^{(e-b)} \times (1.f) \tag{1}$$

where b is referred to as an exponent bias and its value is approximately a half of the maximum value of the exponent e. Then, an integer 1 is added to the decimal number part f, and the integer part connected with the decimal number part is referred to as a mantissa part. The above-expressed number is called as a normalized number.

In expression, the symbol ^ denotes a power, for example, 2^(e-b) means raising 2 to the (e-b)th power. Any value except the mantissa part is expressed by decimal notation so long as notice is not especially mentioned.

In the following, a floating-point calculation processing will be explained. Assuming that, for simplicity, 1 bit is allocated to a sign, 3 bits to an exponent part, and 4 bits to a decimal number part a, subtraction of two floating-point numbers represented by expressions. (2) and (3) will be explained.

$$(-1)^0 \times 2^{(4-b)} \times (1.0011) \tag{2}$$

$$(-1)^0 \times 2^{(2-b)} \times (1.0001) \tag{3}$$

At first, before executing the subtraction, values of the exponents of the above-mentioned two numbers are conformed to the larger value. Thus, the mantissa part of the number having the smaller value of the exponent part is shifted by the difference between the two exponent parts to the lower part. The shift processing is referred to as digit adjustment, and the expression (3) is changed to an expression (4) by this digit adjustment.

$$(-1)^0 \times 2^{(4-b)} \times (0.010001) \tag{4}$$

Then, the mantissa part of the expression (4) is subtracted from the mantissa part of the expression (2). The subtraction result is shown by an expression (5).

$$(-1)^0 \times 2^{(4-b)} \times (0.111011) \tag{5}$$

Since the integer part of the mantissa part of the expression (5) is 0, the mantissa part is not a normalized one. For normalizing the mantissa part, at first, the most significant digit having a value 1 (the first digit having a value 1 in viewing from the most upper digit of the decimal number part, and then the mantissa part is shifted so that the digit firstly having a value 1 is positioned at the integer part. Then, the shift amount of the mantissa part is subtracted from the exponent part. The above-mentioned processing is referred to as normalization, and the expression (5) is changed to an expression (6) by the normalization.

$$(-1)^0 \times 2^{(3-b)} \times (1.11011) \tag{6}$$

Then, since the decimal number part of the expression has five digits, the decimal number part is shortened to a digit length (4 digits in the example) of the predetermined format by using a prepared rounding method. The processing is referred to as round-off processing. For example, the result of the round-off for the expression (6) is shown by an expression (7).

$$(-1)^0 \times 2^{(3-b)} \times (1.1110) \tag{7}$$

The above-mentioned processing is an example of floating-point calculation processing.

An example of the conventional floating-point calculation method as mentioned above is described in Japanese Patent Application Laid-Open No. 232723/1990. A block diagram of a calculation apparatus using the above-mentioned method is shown in FIG. 24.

Figure 24:
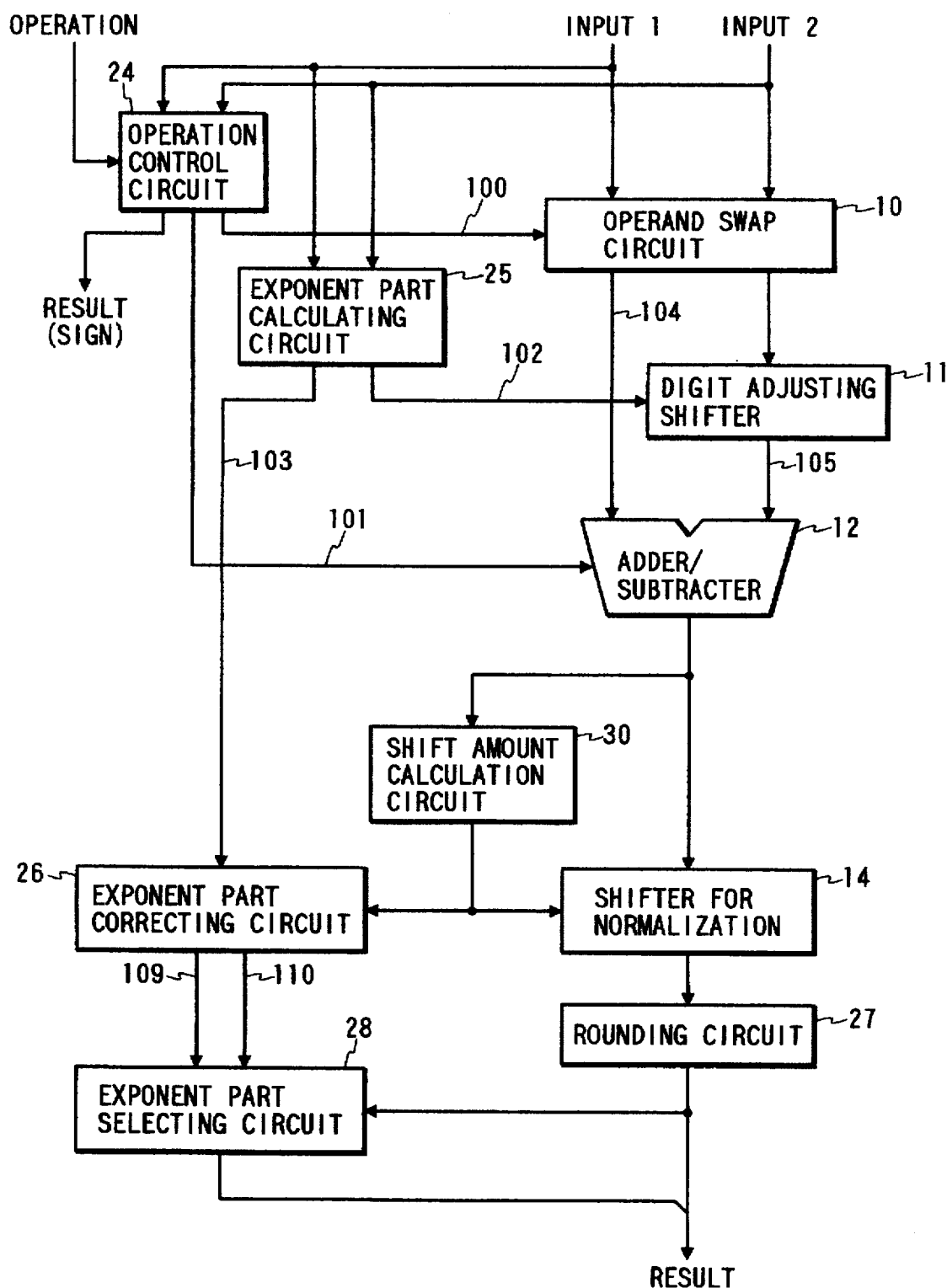
FIG. 24 is a block diagram of a conventional floating-point adder.

In FIG. 24, an operation control circuit 24 generates a sign of a calculation result and control signals needed for calculation by using two floating-point operands and by an operation indication of addition or subtraction. An operand swap circuit outputs a mantissa part having a larger absolute value of operand and a mantissa part having a smaller absolute value of operand, respectively, based on comparison of the absolute values of the two floating-point operands by the operation control circuit 24.

An exponent part calculation circuit 25 takes in the exponent parts of the floating-point operands and outputs the difference between the two exponent parts, and the value of the larger exponent part. A digit adjusting shifter 11 shifts the mantissa part of the operand having the smaller absolute value output from the operand swap circuit 10 by the difference between the two exponent parts output from the exponent part calculation circuit 25 toward the lower digit direction. An adder/subtracter 12 adds the mantissa having a larger value output from the operand swap circuit 10 and the data output from the digit adjusting shifter 11, or subtracts them.

A shift amount calculating circuit 30 calculates the number of places from the most significant digit having a value 1 of the calculating result to the first digit of the integer part. A shifter for normalization 14 shifts the output data from the adder/subtracter 12 by the shift amount output from the shift amount calculating circuit 30. A rounding circuit 27 determines whether +1 is to be added to the data existing at the digit positions in the upper direction from the lowest digit in the format of the data output from the shifter for normalization 14, based on the data existing at the digit positions in the lower direction from the lowest digit in the format of the data output from the shifter for normalization 14, a sign of the calculation result, the predetermined round-off mode and so on, that is, judges generation of a carry by a rounding operation.

The rounding circuit 27 adds +1 to the lowest digit of the normalization shift result if it is judged that an increment is generated by the rounding operation. And, if it is judged that an increment is not generated by the rounding operation, the normalization shift result is output in intact.

An exponent part correcting circuit 26 subtracts the shift amount output from the shift amount calculating circuit 30 from the value of the larger exponent part output from the exponent part calculation circuit 25, and adds +1 to the subtraction result.

An exponent part selecting circuit 28 selects the data having a larger value from the results output from the exponent part correcting circuit 26 as a value of the exponent part if the second digit in the integer part of the result output from the rounding circuit 27 has a value 1, that is, all digits lower than the first digit of the integer part of the mantissa part of the result have a value 0 otherwise, it selects the data having a smaller value as a value of the exponent part. By the above-mentioned method, a result of floating-point addition/subtraction is obtained.

However, such a method requires a large computation load, namely, much computation time.

Accordingly, a floating-point calculation apparatus of the present invention comprises a shift amount approximation predicting circuit for predicting the shift amount for normalization by using input data to the adder/subtracter within an error of n bits, a shift error detecting circuit for detecting the difference between the predicted shift amount and the correct shift amount, and a n-bit shifter for shifting the normalization shift result, obtained by using the predicted shift amount, by the shift error amount.

In the following, an operation algorithm used for the shift amount approximation predicting circuit is will be explained.

The algorithm does not require a carry propagation or logical operation steps for a long series of bits as needed for addition/subtraction processing, and can obtain the number of successive digits having a value 0 from the most significant digit of an addition/subtraction result within an error of 1 bit using a carry propagation for at most 2 bits and a two step logical operation.

Data after complementary processing are denoted as A and B.

$$A = A[0]A[1] \ldots A[n] \quad (8)$$

$$B = B[0]B[1] \ldots B[n] \quad (9)$$

Then, the following two operations represented by Eqs. (10) and (11) are executed using A and B.

$$X = A \oplus B \quad (10)$$

$$P = A | B \quad (11)$$

where "$\oplus$" is an exclusive OR operator, and "|" is a OR operator.

Then, the operation represented by Eq. (12) is executed using X and P.

$$Z = X \oplus (P \ll 1) \quad (12)$$

where "$\ll$" is a shift operator, and "$\ll$" means "one bit shift to the left". The digit exceeding the most upper digit before the shift is neglected. Z of Eq. (12) indicates the number of successive 0 digits from the most significant digit of the addition result. An example using concrete data is described in the following.

$$A = 01011001 \quad (13)$$

$$B = 10111101 \quad (14)$$

The data A and B are substituted in Eqs. (10) and (11), and then, $$X = 11100100 \quad (15)$$

$$P = 11111101 \quad (16)$$

The data X and P are substituted in Eq. (12), and then, $$Z = 00011110 \quad (17)$$

Data Z indicates that, as a result of addition of A and B, the upper successive 3 digits have a value 0 and the fourth digit has a value 1 at first.

Actually, the result of addition of A and B is obtained as follows.

$$S = 00010110 \quad (18)$$

And each most significant digit having a value 1 agrees between Eqs. (17) and (18).

Another example is shown in the following.

$$A = 01010001 \quad (19)$$

$$B = 10111101 \quad (20)$$

$$X = 11101100 \quad (21)$$

$$P = 11111101 \quad (22)$$

$$Z = 00010110 \quad (23)$$

$$S = 00001110 \quad (24)$$

However, each most significant digit having a value 1 does not agree between Eqs.(23) and (24). As shown above, the most significant digit having a value 1 of the calculated result Z of Eq.(12) conforms to that of the addition result S, or exists at the position higher by 1 digit than that of the addition result S. This is because the successive 0 digits from number of the most upper digit of the result of the addition is correctly calculated except for the last 0 by Eq.(12). This can be proven as follows.

The value of the i th digit is denoted as $S[i]$ and the value of the i+1th digit is denoted as $S[i+1]$, in the addition result of Eqs.(8) and (9). Then, the following equations are derived.

$$S[i] = X[i] \oplus C[i+1] \quad (25)$$

$$= X[i] \oplus (G[i+1] | (P[i+1] \& C[i+2])) \quad (26)$$

$$S[i+1] = X[i+1] \oplus C[i+2] \quad (27),$$

where $X[i+1], G[i+1]$ and $P[i+1]$ are the logical exclusive OR, operation the logical AND, and the logical OR, respectively, and $C[i+1]$ is a carry from the i+1 th digit to i th digit. And, the symbols "$\oplus$", "&" and "|" represent bit operators of the logical exclusive OR, the logical AND and the logical OR, operations respectively. Then, if $S[i]$ and $S[i+1]$ are 0, The following equations are derived. At first, from Eq.(27), the following two equations are derived.

$$X[i+1] \oplus C[i+2] = 0 \quad (28)$$

$$X[i+1] = C[i+2] \quad (29)$$

Then, by substituting Eq.(29) for Eq.(26), Eq.(30) is obtained.

$$X[i] \oplus (G[i+1] | (P[i+1] \& X[i+1])) = 0 \quad (30)$$

Further, since $$G[i+1] | (P[i+1] \& X[i+1]) = P[i+1] \quad (31),$$

Eq.(30) is changed to Eq.(32).

$$X[i] \oplus P[i+1] = 0 \quad (32)$$

Namely, if both $S[i]$ and $S[i+1]$ are o, Eq.(32) holds. From the above-mentioned relations, it can be seen that, if all digits from the uppermost digit to the i+1 th digit of an addition result are 0, Eq.(32) holds for all digits from the uppermost digit to the i th digit. It means that all digits from the uppermost digit to the i th digit are 0. Then, it is proven that the position of the most significant digit having a value 1 as to the addition results can be predicted.

Thus the processing apparatus according to the present invention, comprises:

a pre-shifter for shifting two forming part mantissas of two floating-point number operands by one digit in a lower direction if an effective addition is executed, the one digit shift being not executed if an effective subtraction is executed;

an adder/subtracter for adjusting the digit of the two mantissas of the floating-point number operands output from the pre-shifter, and for calculating addition/subtraction;

a first round-off judging circuit for determining generation of a carry, due to a round-off operation by using data of the lower digits from the minimum digit of a predetermined data format, in a result of said addition/subtraction, and for outputting information on generation of a carry;

a second round-off judging circuit for determining generation of a carry, due to a round-off operation by using data of further lower digits from 1 digit lower data than said minimum digit, in a result of said addition/subtraction, and for outputting information on generation of a carry;

a round-off carry selecting circuit for detecting a digit having a value 1 in an upper position in a result of addition/subtraction, for selecting and outputting an output from said first round-off judging circuit if the digit having a value 1 exists at a first digit of an integer part, and for selecting and outputting an output from said second round-off judging circuit; a normalization circuit for normalizing a result of said addition/subtraction; and a rounding a circuit for rounding result of said addition/subtraction corresponding to said output from one of said first and said round-off carry selecting circuit.

A processing method of addition/subfraction, comprises the steps of:

shifting the two mantissas of floating-point operands by 1 digit in the lower direction if effective addition is executed;

adding the two shifted mantissas after the digit adjustment of the two shifted mantissa is carried out if effective addition is executed;

judging carry generation by using the first data group of data existing in the lower digits from the minimum digit of the predetermined format and the second data group existing in the lower digits from the digit lower by 1 digit than the minimum digit;

rounding and normalizing the obtained addition result by using the first data group if the digit having a 1 value is at the first digit position of the integer part, and by using the second data group if the digit having a 1 value is at the first digit position of the decimal number part.

In the following, the relation between the normalization shift and the round-off will be explained for floating-point addition/subtraction processing. FIG. 16 shows a summary of the relation between the normalization shift and necessity of round-off processing, by noticing the position of the digit having a value of 1, of an addition/subtraction result. In the following example, the digit length of the decimal number part of a data format is 52.

Firstly, the case of an effective addition will be explained in the following. Let the mantissa parts of two data after the digit adjusting be M and N, $$1 \leq M \leq 2 - 2^{\wedge}(-52) \quad (33)$$

$$1 \leq L \leq 2 - 2^{\wedge}(-52) \quad (34)$$

Therefore, the addition result A is represented as follows.

$$A = M + L, 1 \leq 3 \; A \leq 4 - 2^{\wedge}(-51) \quad (35)$$

The most significant digit having a value 1, of the addition result A, exists at the first digit or the second digit, where the second digit of the integer part refers to the second digit in the left direction from the decimal point.

Since data is shifted by an indefinite amount for digit adjustment, the digit length of the addition result A may exceed the digit length of the format. Then, the round-off judgement is always needed.

Next, the case of an effective subtraction will be explained in the following. Since a very small value is obtained in the subtraction between two data having a value near each other, a large amount of normalization digit shift is needed.

In case the exponent parts of the two input data have the same value, the two mantissas after digit adjustment will be as follows.

$$1 \leq M \leq 2 - 2^{\wedge}(-52) \quad (36)$$

$$1 \leq L \leq 2 - 2^{\wedge}(-52) \quad (37),$$

where $L \leq M$.

Then, the subtraction result A is expressed by the following equation.

$$A = M - L, 1 \leq A \leq 1 - 2(-52) \quad (38)$$

The most significant digit having a value 1, of the subtraction result A, exists at an indefinite position of the 53 digit from the first digits of the integer part to the 52 th digit, and the normalization shift amount can have an indefinite value of the number from 0 to 52. Since the subtraction result A stays in the range from the first digit of the integer part to the 52 th digit of the decimal number part, a carry by the round-off does not occur. Therefore, the round-off judging is not necessary.

Next, in case the difference between the exponent parts of the two data is 1, the two mantissa parts are expressed as follows.

$$1 \leq M \leq 2 - 2^{\wedge}(-52) \quad (39)$$

$$0.5 \leq L \leq 1 - 2^{\wedge}(-53) \quad (40)$$

Then, the subtraction result A is expressed by the following equation.

$$A = M - L, 2^{\wedge}(-53) \leq A \leq 1.5 - 2^{\wedge}(-52) \quad (41)$$

The most significant digit having a value 1, of the subtraction result A, exists at an indefinite position of 54 digits from the first digit of the integer part to the 53 th digit, and the normalization shift amount can have an indefinite value of the number from 0 to 53. Thus the subtraction result A stays in the range from the first digit of the integer part to the 53 th digit of the decimal number part. Therefore, the round-off judging is not necessary if the normalization shift amount is 1 or more, although the round-off judging is necessary if the normalization shift amount is 0.

Lastly, in case the difference between the exponent parts of the two data is 2 or more, the two mantissa parts are expressed as follows.

$$1 \leq M \leq 2 - 2^{\wedge}(-52) \quad (42)$$

$$0 \leq L \leq 0.5 - 2^{\wedge}(-54) \quad (43)$$

Then, the subtraction result A is expressed by the following equation.

$$A = M - L, 0.5 + 2^{\wedge}(-54) \leq A \leq 2 - 2^{\wedge}(-52) \quad (44)$$

The most significant digit having a value 1 is the first digit of the integer part or the first digit of the decimal number part, the normalization shift amount is 0 or 1 to the upper direction. And the digit length of the subtraction result A exceeds the digit length of the data format. Therefore, The round-off judging is always necessary.

To sum up the above explanation, in case the most significant digit having a value 1 exists at a position of the first and second digit of the integer part, and the first digit of the decimal number part, the round-off judging is necessary since a carry by the round-off may occur, otherwise the round-off judging is not necessary.

By using the relation between the normalization shift amount and the round-off, the above-mentioned round-off judging is executed in advance. Then, it is possible to select the correct round-off judging result by using the values of the successive three digits from the second digit of the addition/subtraction result.

The present invention offers an apparatus and a method capable of further reducing the computing time by reducing three cases to two cases needed for the round-off judging.

That is, in accordance with the present invention, the addition result is shifted by 1 digit to the lower direction for the effective addition. Then, it is possible to reduce an case number needed for the round-off judging to two cases, also in the effective subtraction, since the most upper digit having a value 1 exists at the first digit of the integer part or the first digit of the decimal number part. The above-mentioned round-off cases are summarized and shown in FIG. 17.

In the effective addition, the shifting the addition result by 1 digit to the lower direction is simply realized by shifting the mantissa parts of the two operands by 1 digit to the lower direction before the addition in advance. Although it is necessary to add 1 to the exponent parts of the operands because the mantissa parts of the operands are shifted by 1 digit to the lower direction, it is realized by adding 1 to the exponent value selected in the digit adjusting.

As mentioned above, by predicting the normalization shift amount by using two operands input to the adder/subtracter within the error of 1 bit, it is possible to execute the normalization shift processing and the addition/subtraction processing in parallel. Further, it is possible to obtain a correct normalization by the shift error detecting and normalization shift correction.

Thus, in accordance with the present invention, the case number of the round-off judging for the addition/subtraction result can be restricted to two cases, that is, the case in which the most significant digit having a value 1 of the addition/subtraction exists at the first digit of the integer part and the case in which the digit exists at the first digit of the decimal number part, by shifting the mantissa parts of the two floating-point operands by 1 digit in the lower direction in the digit adjusting of the effective addition.

Therefore, since the round-off judging can be executed by using the addition/subtraction results before the normalization shift processing, the round-off judging and an increment of the addition/subtraction result can be processed in parallel with the shift amount calculation for the normalization shift.

In the following, the present invention will be explained more in detail.

FIG. 1 shows a diagram of a computer system using the present invention. A plurality of computers, each having a processor 33, a memory 34 and hard disks 35, are connected to each other via an integrated network 32. In such a computer system, the present invention is applied to the processor 33 executing the numerical processing.

Figure 2:
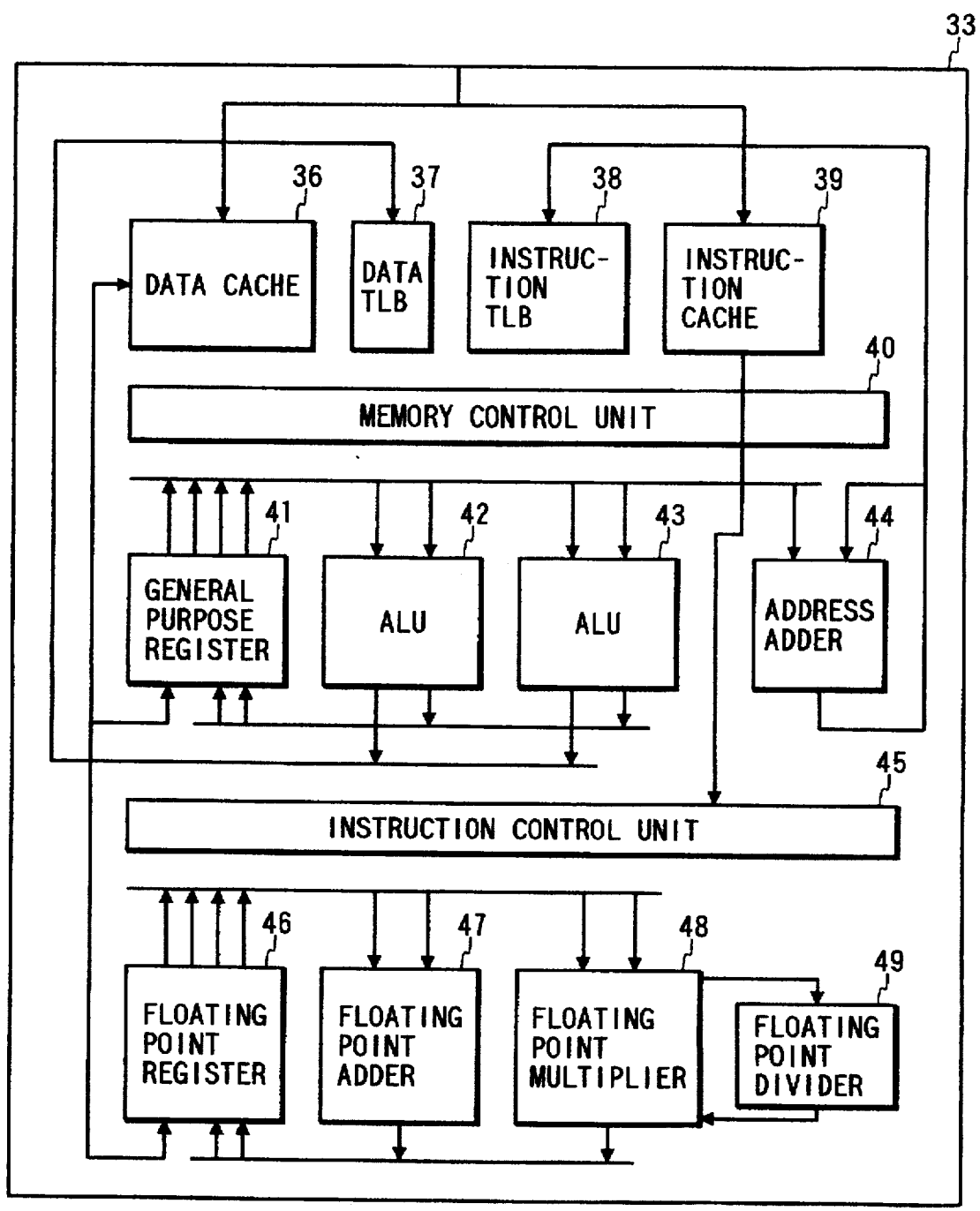
FIG. 2 is a block diagram of the example processor 33 shown in FIG. 1.

FIG. 2 shows an example of processor 33. The processor includes a data cache 36 and an instruction cache 39 so that the access to data and instructions can be executed at high speed. The changing of the memory address from a virtual address to a physical address is executed by using a data TLB 37 and an instruction TLB 38. The control to those devices is executed by a memory control unit 40. The integer calculation is executed by a general purpose register 41, ALU 42 and ALU 43. The instruction address operation is executed by an address adder 44. The floating-point processing is executed by a floating-point register 46, a floating-point adder 47, a floating-point multiplier 48 and a floating-point divider 49. The control to those devices is executed by an instruction control unit 45. In the scientific and technical field or the computer graphic field, a very high floating-point calculation performance is required. Especially, a high speed floating-point adder is important since the floating-point addition instruction is frequently used in the floating-point calculation instructions. The present invention is applied to such a floating-point adder 47.

Figure 3:
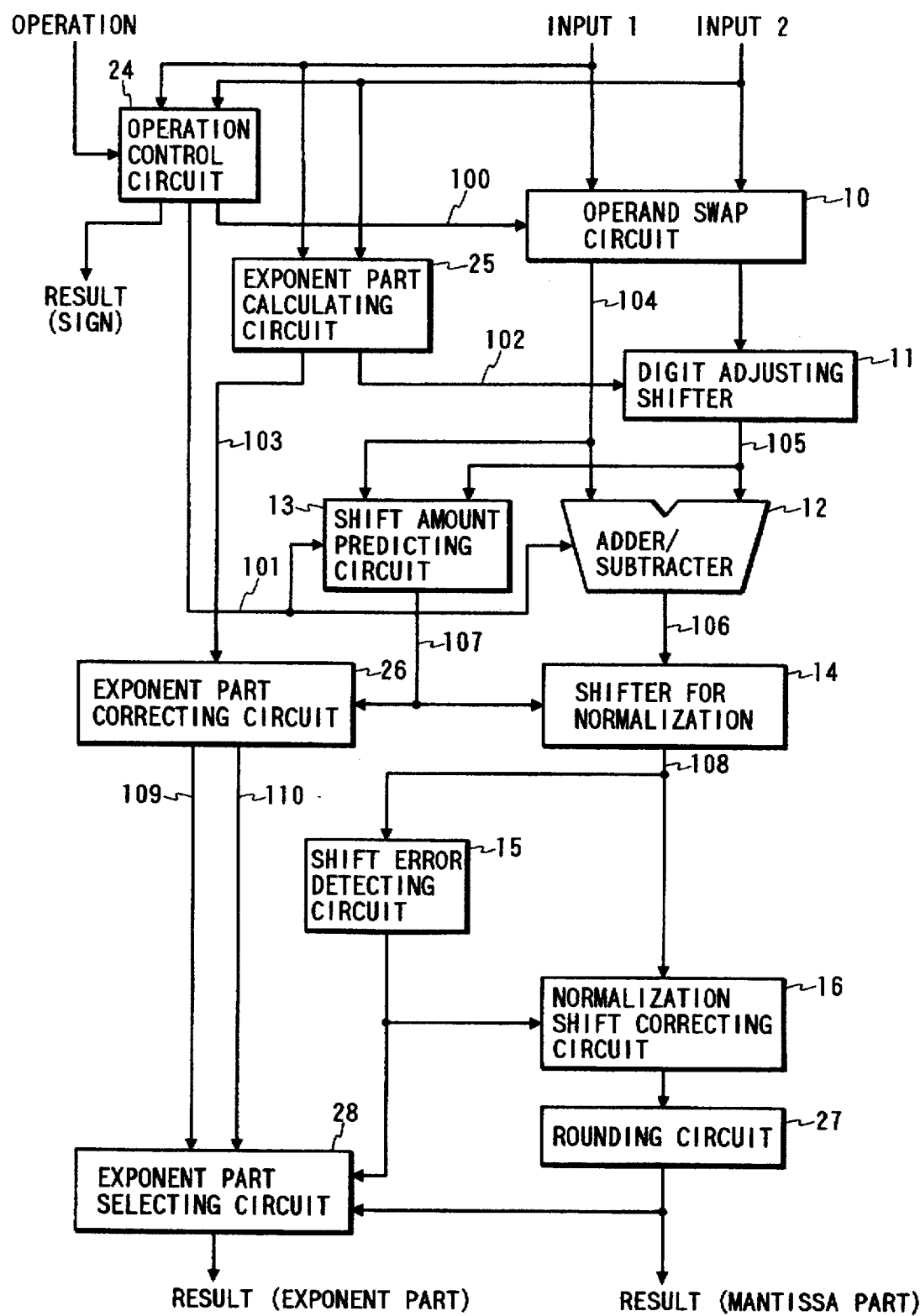
FIG. 3 is a block diagram showing an example of a floating-point adder using a normalization shift prediction method of the present invention.

At first, an embodiment aiming at the speed-up of the normalization processing which is the first object of the present invention will be explained. FIG. 3 shows an embodiment of the floating-point adder 47. The floating-point adder shown in FIG. 3 comprises a operand swap circuit 10, a digit adjusting shifter 11, an adder/subtracter 12, a shift amount predicting circuit 13, a shifter for normalization 14, a shift error detecting circuit 15, a normalization shift correcting circuit 16, an operation control circuit 24, an exponent part calculating circuit 25, an exponent part correcting circuit 26, a rounding circuit 27 and an exponent part selecting circuit 28. The calculation apparatus forming this embodiment executes addition/subtraction of the two operands input to apparatus, and outputs the results of the normalization and a rounding of a calculation result.

In the following, the embodiment will be explained with reference to a calculation using data of IEEE-754 double precision format as an example data format. However, the application of the present invention is not restricted to a calculation using data having a double precision format, but is also applicable to a calculation using data having a single precision format, quadruple precision format and formats other than an IEEE format.

Hereinafter, the embodiment will be explained by referring to the drawings.

Figure 4:
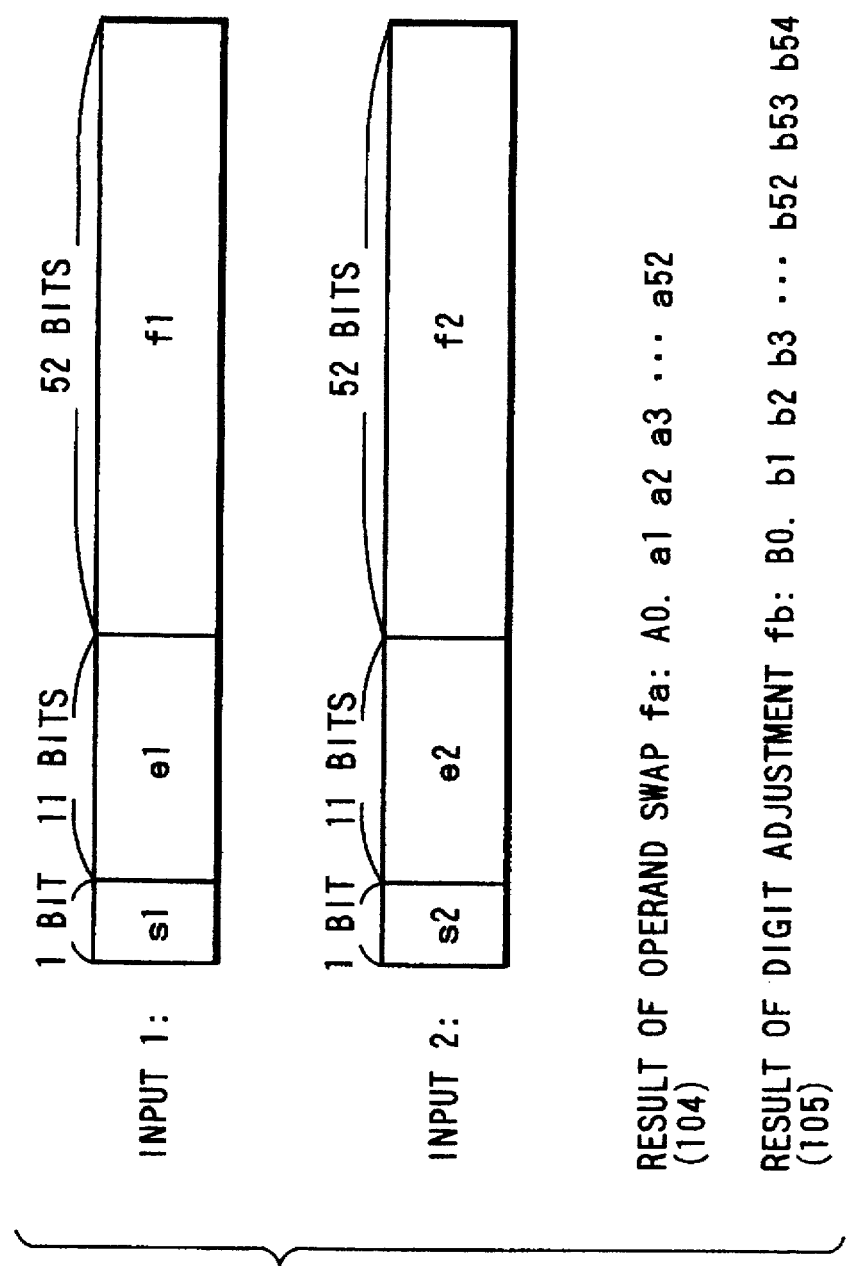
FIG. 4 is a diagram showing an example of a method of expression of a floating-point number.

Firstly, the operand swap circuit 10 and the digit adjusting shifter 11 will be described. FIG. 4 shows the format of input operands, the mantissa part fa(104) of an operand swap result and the mantissa part fb(105) of a digit adjusting result. Table 1 in FIG. 25 shows the functions of the operand swap circuit 10 and the digit adjusting shifter 11. The larger one of the exponent parts e1 and e2 of the two input operands is selected as the exponent part ec(103) after the digit adjusting. The mantissa part fa(104) after the operand swap has a value obtained by connecting 1 attached to the integer part to the decimal number part of the operand having the larger exponent part. The mantissa part fb(105) after the digit adjusting has a value obtained by connecting 1 attached to the integer part to the decimal number part of the operand having the smaller exponent part and further shifting the connected data by the difference between the two operands in the lower direction, where a signal b55 of the lowest digit of fb(105) is the OR value of all of the digits canceled from the 55 th digit by the shifting. In the addition/subtraction process of this embodiment, an accuracy problem does not occur even if the digit length in the digit adjusting is restricted to 55 digits of the decimal number part.

By the instruction of operation and signs s1 and s2, the processing of the mantissa parts is determined as one of an effective addition (fa+fb), an effective subtraction A(fa−fb) and an effective subtraction B(fb−fa). To execute the processing by the adder/subtracter 12, the operation control circuit 24 generates addition/subtraction control signals 101. In Table in FIG. 26, the exemplary addition/subtraction control signals 101 are shown as being composed of three signals 101a, 101b and 101c. The control signal 101a has a value 1 in the case of the effective subtraction B and is used to produce a complement of the mantissa part fa(104) after the operand swap. The control signal 101b has a value 1 in the case of the effective subtraction A and is used to produce a complement of the mantissa part fb(105) after the digit adjusting. The control signal 101c has a value 1 in the case of the effective subtraction A or B is and used to produce the complement of a mantissa part in executing the subtraction by the adder/subtracter 12.

Figure 5:
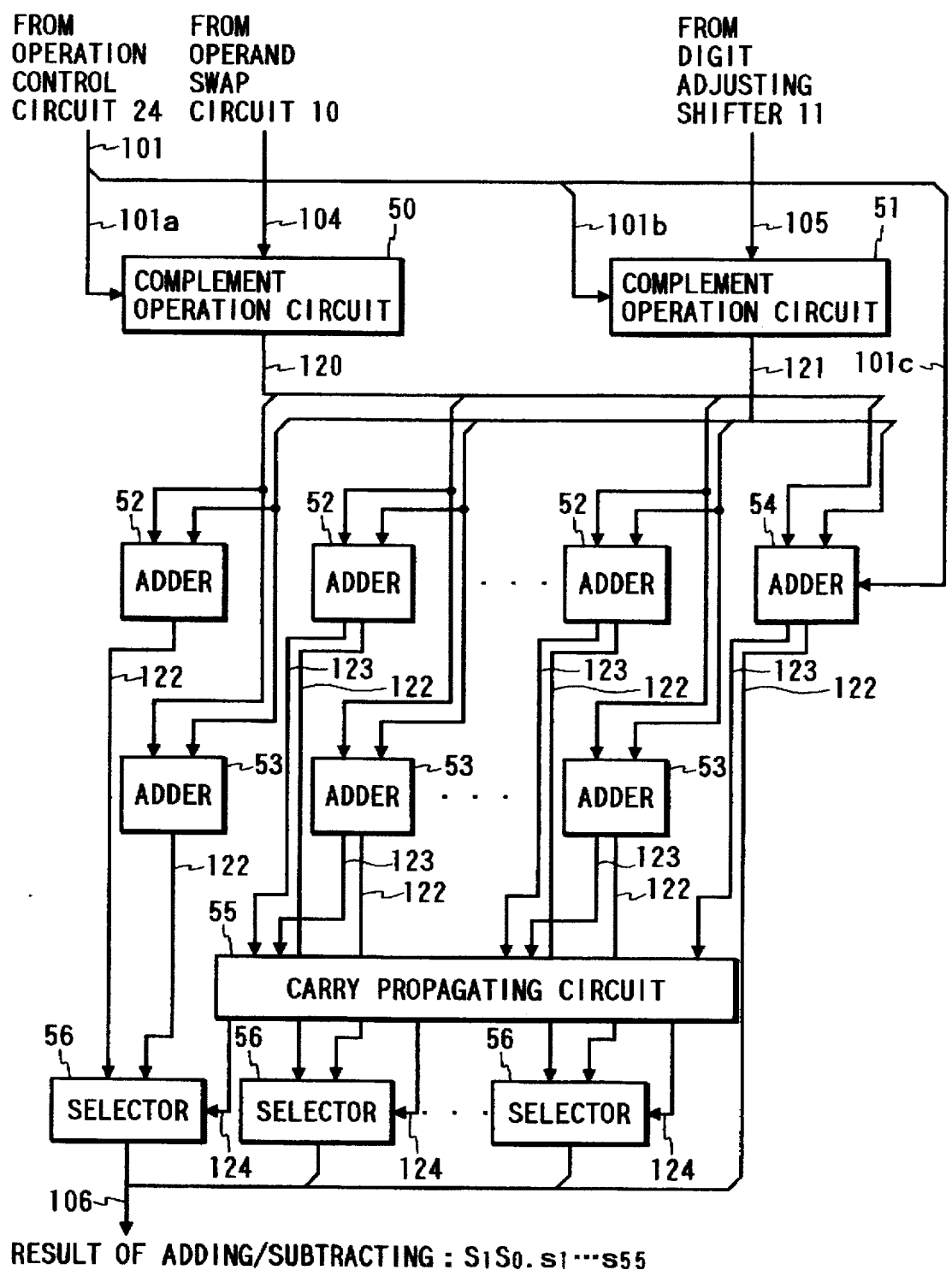
FIG. 5 is a detailed block diagram of the adder/subtracter 12 shown in FIG. 3.

Next, the adder/subtracter 12 will be explained. FIG. 5 shows an example of the adder/subtracter and a block diagram of a carry look-ahead adder frequently used in a LSI. Complement circuits 50 and 51 produce the complements of the mantissa parts fa(104) and fb(105) in the effective subtraction processing. The control of producing complements is executed by using each of the addition/subtraction control signals 101a and 101b. Each of outputs 120 and 121 of the complement circuits 50 and 51 is divided into fields by a unit of several bits, and the addition is executed in each field. The numeral 52 indicates an adder wherein it is assumed that a carry does not occur from the lower digits, and the numeral 53 indicates an adder wherein it is assumed that a carry occurs from the lower digits. And, the numeral 54 indicates an adder wherein the addition/subtraction control signal 101c is used as a carry to the lowest digit of the data format. Then, in the figure, the left direction refers to the upper direction. The adders 52, 53 and 54 calculate the sum for each field 122 and a carry in each field 123. The carry 123 is input to a carry propagation circuit 55 and a correct carry to each field 124 is calculated. The numeral 56 indicates a group of addition result selectors each of which selects a correct one of the two sums 122 by the adders 52 and 53 for each field by using the carry 124. By the above-mentioned processing, the addition/subtraction result [S1 S0.s1 ... s55] (106) is obtained.

Figure 6:
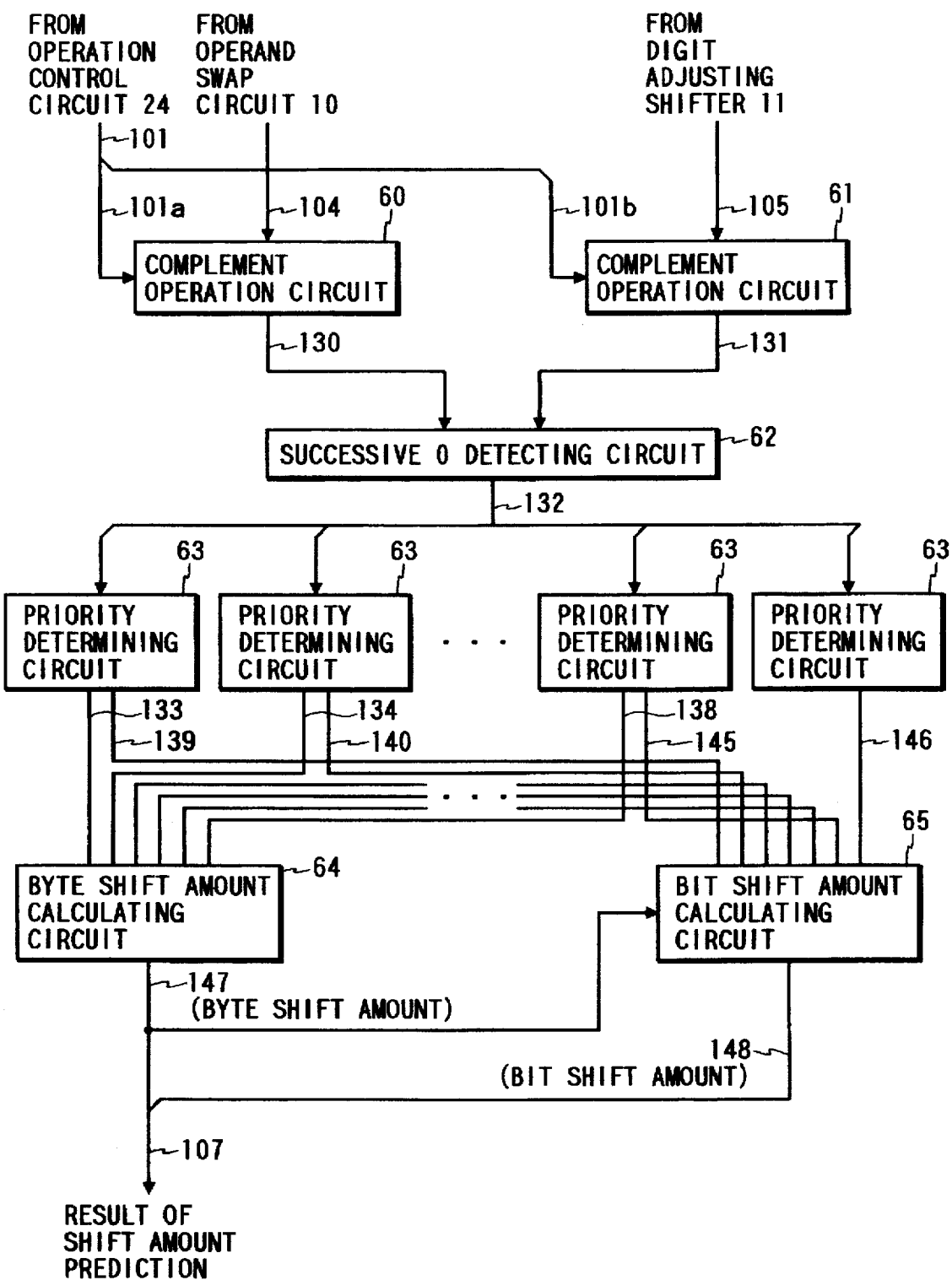
FIG. 6 is a detailed block diagram of the shift amount predicting circuit 13 shown in FIG. 3.

Next, the shift amount predicting circuit 13 will be explained. FIG. 6 shows an example of the shift amount predicting circuit 13 which predicts the digit length from the most significant digit having a value 1 of the output 106 of the adder/subtracter 12 to the integer part within an error of 1 bit, by using the mantissa part fa(104) output from the operand swap circuit 10, the mantissa part fb(105) output from the digit adjusting shifter 11 and the addition/subtraction control signals 101a and 101b.

Figure 7:
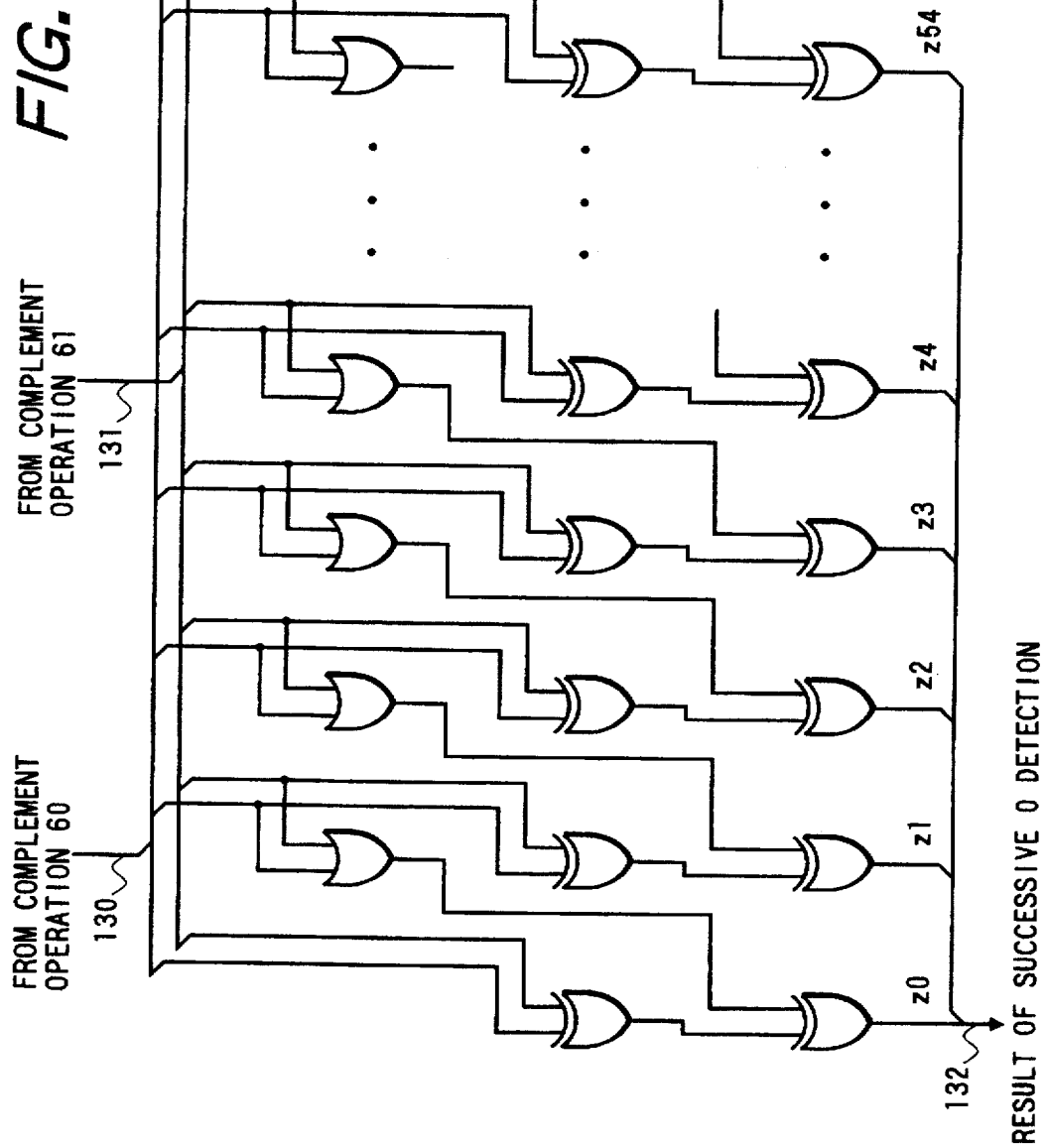
FIG. 7 is a detailed logic diagram of the successive 0 detecting circuit 62 shown in FIG. 6.

Complement circuits 60 and 61 make complements of the mantissa parts fa(104) and fb(105) in the effective addition processing. The control of producing complements is executed by using the addition/subtraction control signals 101a and 101b. A successive 0 detecting circuit 62 obtains the number of successive 0 values from the uppermost digit in the lower direction of the addition results in adding the two output signals 130 and 131 output from the complement circuits 60 and 61. FIG. 7 shows a detailed circuit diagram of the successive 0 detecting circuit 62. The successive 0 detecting circuit executes the logical operations OR (logical add) and XOR (logical exclusive add) for each bit of the output signals 130 and 131 output from the complement circuits 60 and 61, and then executes a XOR operation on each result of the XOR bit operation and each result of the OR bit operation for the digit lower by 1 than the present digit. The resultant 55 bit signal [z0 z1 z2 ... z54] is the result 132 of the successive 0 detection. In the resultant signal, z0 corresponds to the first digit of the integer part, and [z1 ... z54] corresponds to the digits from the first digit to the 54 th digit of the decimal number part. For example, if [z0 ... z5] are all 0 and z6 is 1, the shift amount is set as 6, assuming that the most significant digit having a value 1 of the addition/subtraction result is the sixth digit of the decimal number part. However, the obtained number of successive 0 digits contains the error of 1 bit, that is, there are occasions that the number of successive 0 digits is larger by 1, for example, the correct number of successive 0 digits is not 6 but 5 in the above-mentioned example. The reason why such an error occurs is that, even though a correct carry needs to be input to the last digit of the successive 0 data for obtaining the correct successive 0 detecting, the OR operation result for the one bit lower digit is used in the place of the correct carry in the circuit shown by FIG. 7. As mentioned above, the circuit shown by FIG. 7 can detect the successive 0 digits of the addition/subtraction result by the two stages of XOR circuits. although the detected result by the circuits contains an error of 1 bit.

Figure 8:
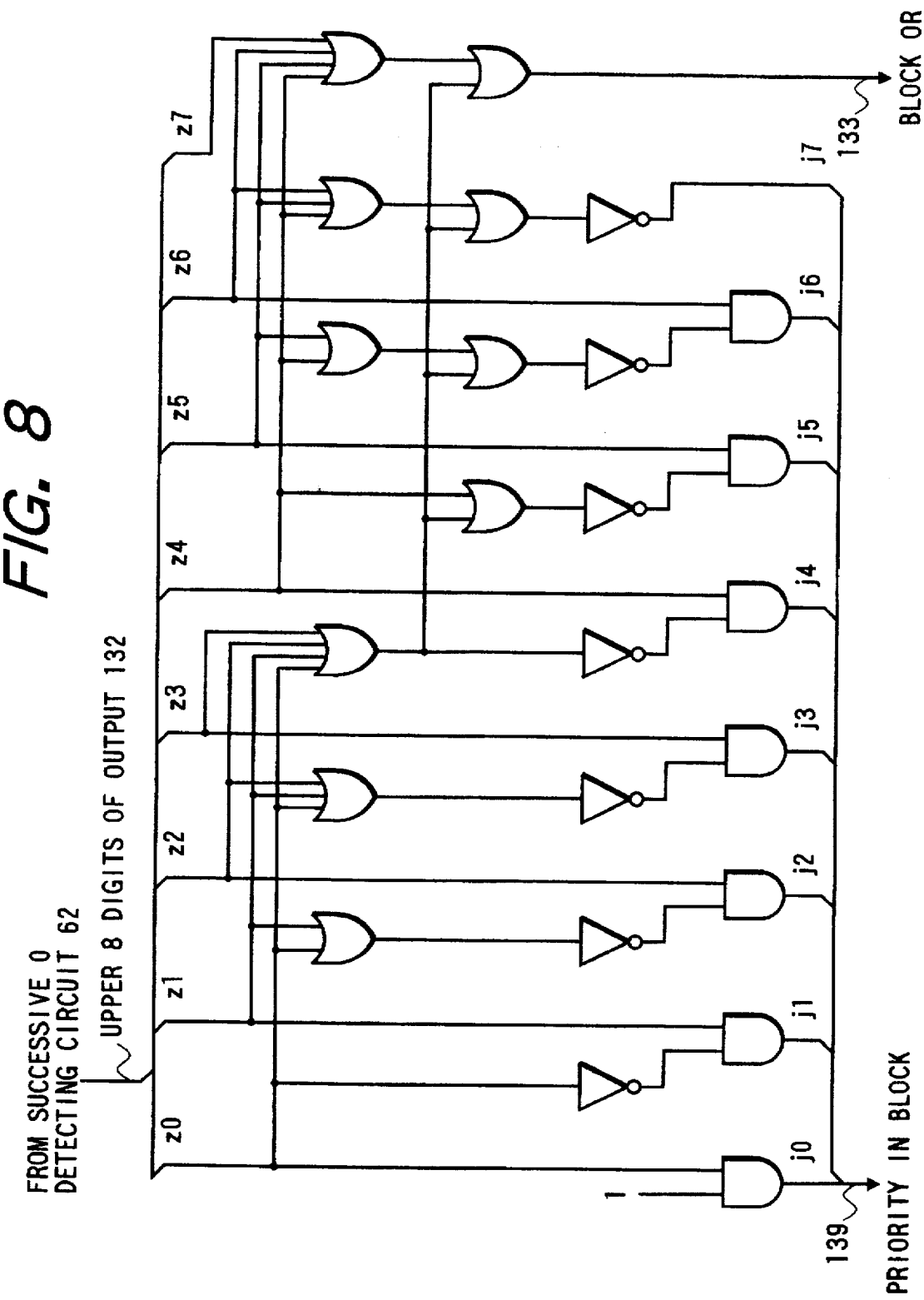
FIG. 8 is a detailed logic diagram of the priority determining circuit 63 shown in FIG. 6.
Figure 9:
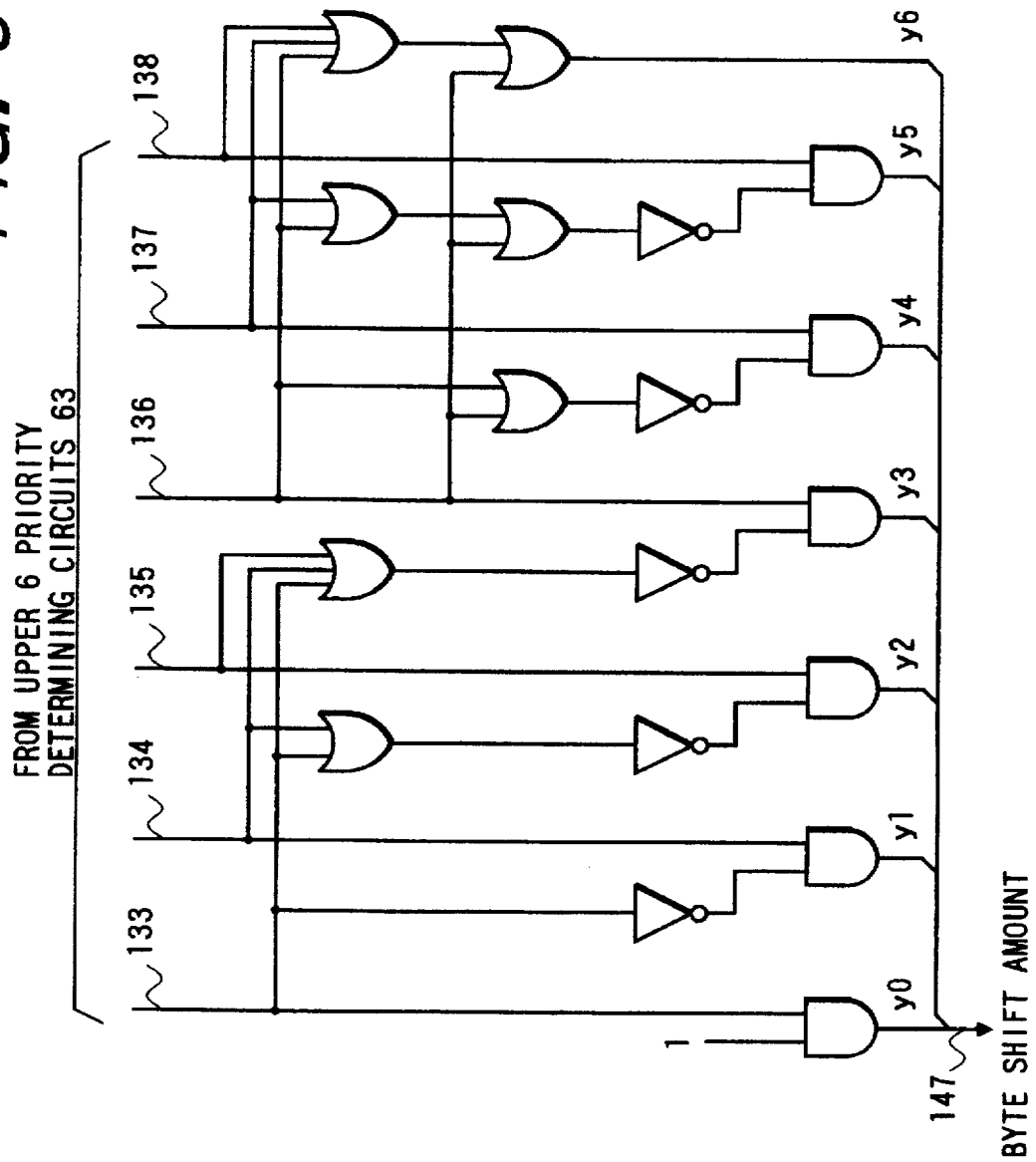
FIG. 9 is a detailed logic diagram of the byte shift amount calculating circuit 64 shown in FIG. 6.
Figure 12:
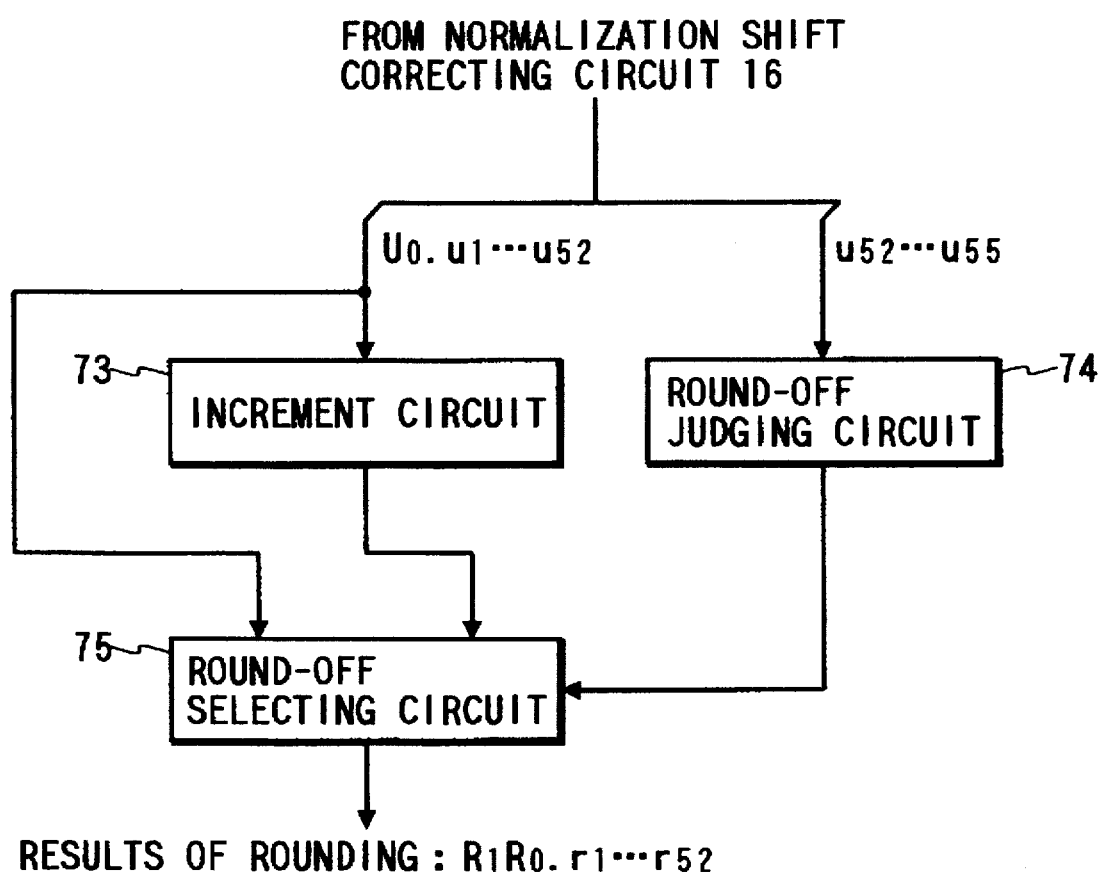
FIG. 12 is a block diagram of the rounding circuit 27 shown in FIG. 3.

By referring to FIG. 6, the shift amount predicting circuit 13 will be further explained. The numerals 63, 64 and 65 indicate a priority determining circuit, a byte shift amount calculating circuit and a bit shift calculating circuit, respectively. An example of the circuit composed of two stages of shifters, which shifts the addition/subtraction result by a byte unit and then shifts the result by a bit unit, as mentioned later, will be explained as the shifter for normalization 14. In such a shifter for normalization, the shift amount needs to be represented by two kinds of amounts, namely one represented by a byte unit and one represented by a bit unit, and the respective ones are to be input to a byte shifter and a bit shifter. The byte shift amount calculating circuit 64 generates a signal 147 indicating the shift amount in byte units. The bit shift amount calculating circuit 65 generates a signal 148 of the shift amount by the bit units. The result of the successive 0 detection is input to the 7 priority determining circuits 63 every 8 bits from the uppermost digit. FIG. 8 shows an example of the priority determining circuit positioned at the uppermost place. The rest of the priority determining circuit have the same constitution as that of the circuits shown by FIG. 8. To the priority determining circuit, the upper 8 bits [z0 ... z7] of the result of the successive 0 detection are input, and a block OR signal 133 and a signal of priority in a block 139 are generated. The block OR signal 133 is the result of an OR operation on the input signals of 8 bits, and if the result is 1, there exists at least one signal having a value 1 in the input signals. The signal of priority in a block 139 is a 8 bit signal wherein the most significant digit having a value 1 keeps the value 1 and the values of the rest are set to 0. Then, if all the upper 7 bits of the input signal are 0, the value of the 8 th digit can be set to 1 as shown in FIG. 8. The reason for this is because the signal of priority in a block 139 is not used in a later calculation if the 8 bits of the input signals are all 0. FIG. 12 shows an example of the byte shift amount calculation circuit 64. The block OR signals (133–138) output from the upper 6 priority determining circuits 63 are input to the byte shift amount circuit 64. The circuit 64 maintains the most significant digit having a value 1 at the value 1, and sets the values of the rest to 0. If the block OR signals (133–138) are all 0, the value of the block OR signal of the lowest position priority determining circuit is regarded as 1. The generated 7 bit signal [y0 y1 ... y6] resulting from the above-mentioned processing is the signal 147 indicating the byte shift amount.

By referring to FIG. 6, the bit shift amount calculating circuit 65 will be explained. One of the priority signals in the blocks (139–146) output from the 7 priority determining circuits 63 is selected by using the byte shift amount signal 147, and is set as the bit shift amount 148.

The byte shift amount 147 and the bit shift amount 148 composes the shift amount predicting result 107.

Figure 10:
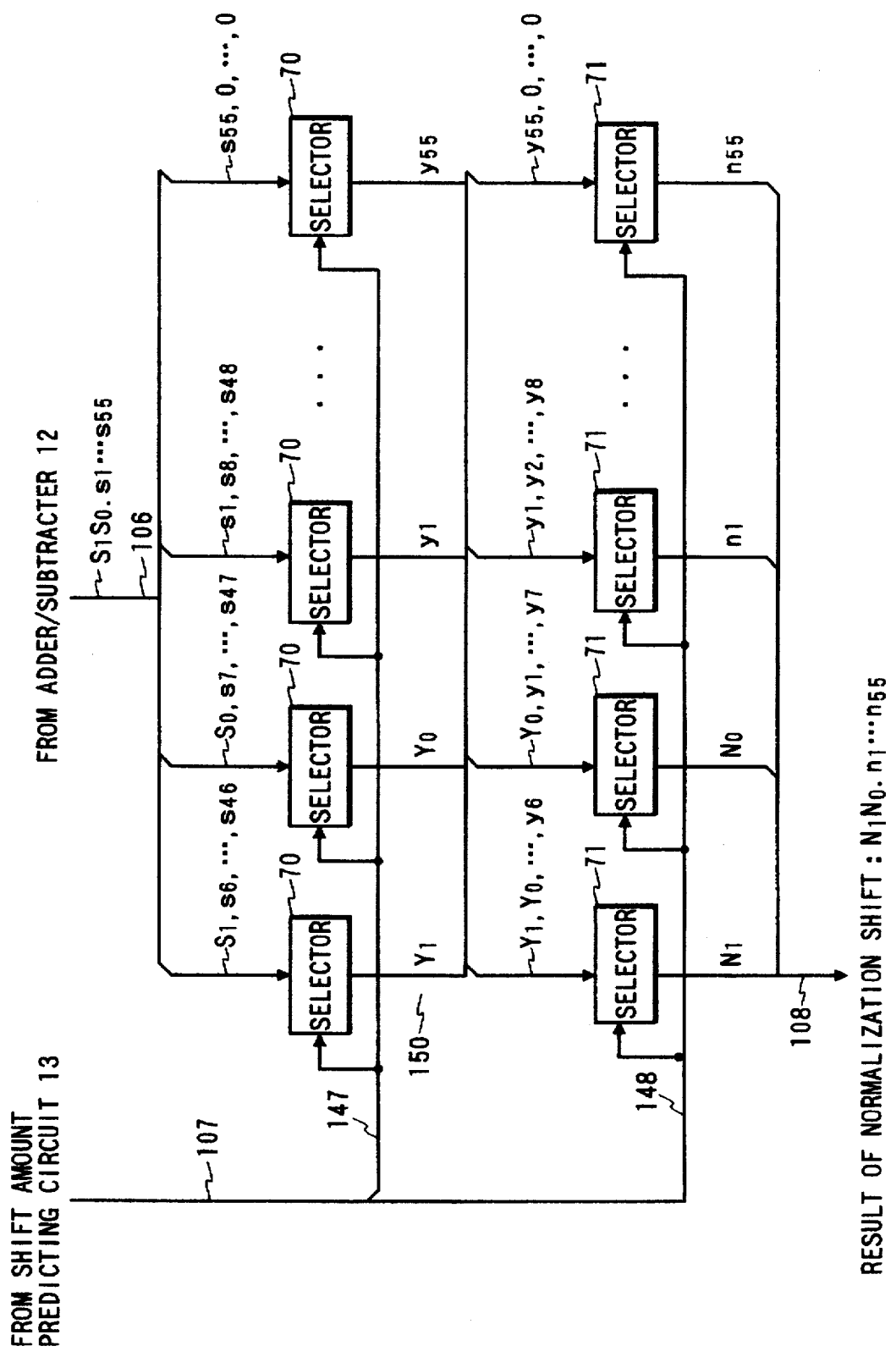
FIG. 10 is a block diagram of the shifter for normalization 14 shown in FIG. 3.

Next, the shifter for normalization 14 will be explained. FIG. 10 shows a block diagram of an example of the shifter for normalization 14 which executes a shift operation by using two stages of shifters, namely, a byte shifter and a bit shifter. The numeral 70 indicates a selector which selects one of 7 inputs, and a byte shifter of 57 bits is composed by using 57 circuits each representing a selector 70. Each selector 70 takes in the values of the corresponding digit and the lower digits, as shown in FIG. 10, of the output signals 106 from the adder/subtracter 12. If there is not a signal to be input, a value 0 is input. The selection of the input signals is executed by using the byte shift amount 147 output from the shift amount predicting circuit 13, and a 57 bit signal [Y1 Y0.y1 y2 ... y55] (150) is generated. The numeral 71 indicates a selector which selects one of 8 inputs, and a bit shifter of 57 bits is composed by using 57 circuits each representing a selector 71. Each selector 71 takes in 8 successive signals from the forefront digit of the digit corresponding to the selector position, from the output signals 150 of the byte shifter. If there is not a signal to be input, the value 0 is input. The selection of the input signals is executed by using the bit shift amount 148 output from the shift amount predicting circuit 13, and a normalization shift result of 57 bits [N1 N0.n1 n2 ... n55] (108) is generated.

Figure 11:
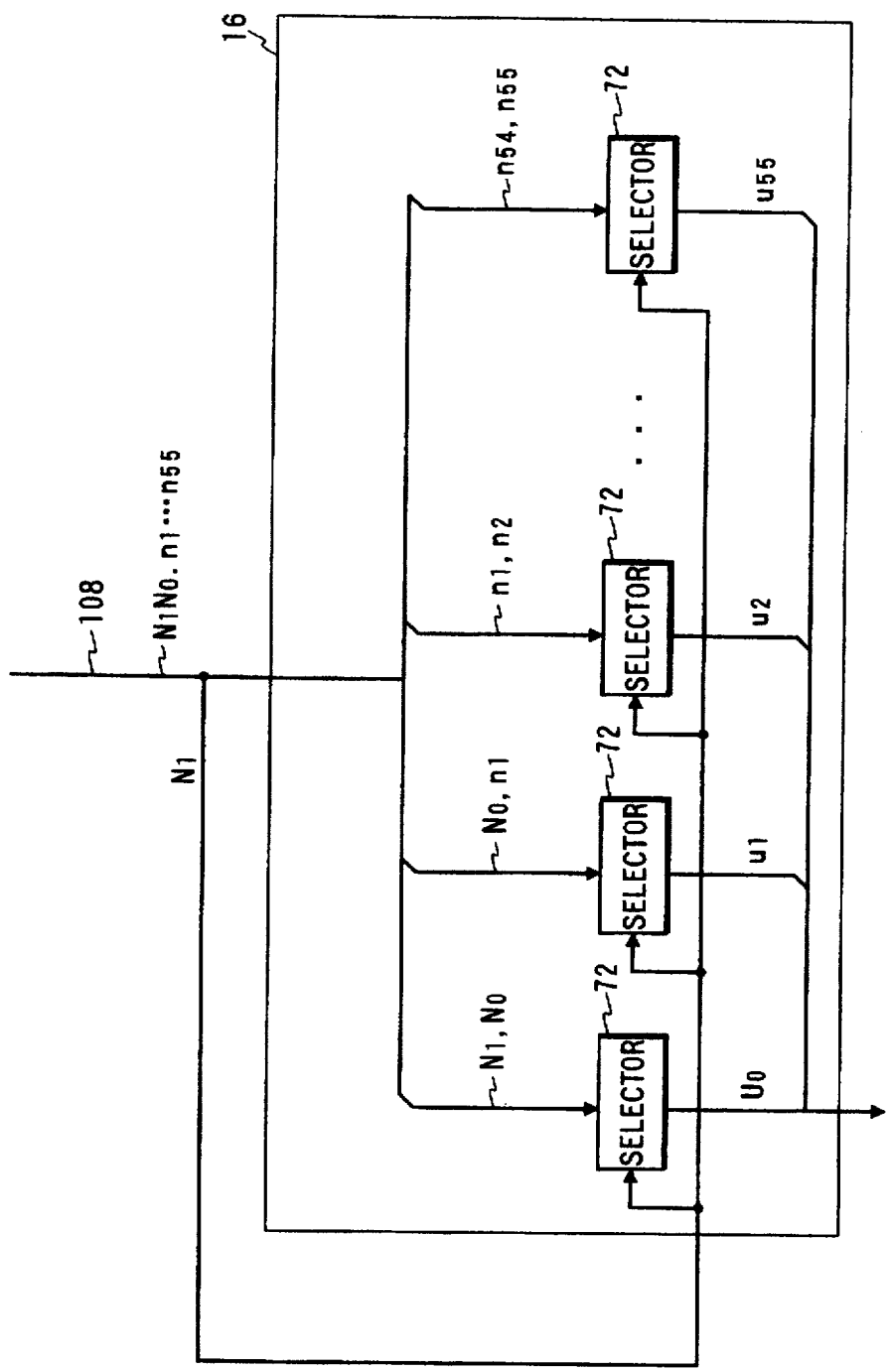
FIG. 11 is a block diagram of the normalization shift correcting circuit 16 shown in FIG. 3.

Next, by referring to FIG. 11, the shift error detecting circuit 15 and the normalization shift correcting circuit 16 will be explained. The output signal 108 of the shifter for normalization 14 is input to the circuits 15 and 16, and the normalization shift result signal 108 is output as it is or by shifting it by 1 digit to the lower direction, by judging the signal from the shift error detecting circuit 15. The numeral 72 indicates a selector which selects one of two inputs, and a 1 bit shifter of 56 bits is composed by using 56 circuits each representing a selector 72. Each selector 72 takes in two signals of the digit corresponding to the selector position and the one bit upper digit, of the normalization shift result 108. The selection of the input signals is executed by using the most upper digit signal N1 of the normalization shift result 108. That is, the 1 bit signal N1 is the shift error detection result. If N1 is 0, since the normalization shift is correctly executed, the correction of the normalization shift is not necessary. If No is 1, since the normalization shift is incorrectly executed at most by 1 bit, the correction of the normalization shift is necessary. By the above-explained processing, the correct normalization shift result [U0.u1 u2 ... u55] can be obtained.

In the following, the rounding circuit 27 will be explained. FIG. 12 shows a block diagram of an example of the rounding circuit 27. The numeral 73 indicates an increment circuit which adds 1 to the last bit in the signal [U0.u1 u2 ... u52] of the upper 53 digit of the normalization shift result. The numeral 74 indicates a round-off judging circuit which generates a carry signal by a round-off operation by using the signal [u52 ... u55] of the lower 4 digits of the normalization shift result. The numeral 75 indicates a round-off selecting circuit which generates the round-off result [R1 R2.r1 r2 ... r52] by selecting the normalization shift correcting result if a carry by the round-off occurs and by selecting the increment result if a carry by the round-off does not occur. The reason why the values of two digits are obtained for the integer part is because there are occasions in which the most significant digit having a value 1 shifts from the first digit to the second digit of the integer part when a carry by round-off occurs if all the 53 digits from the R0 to r52 of normalization shift correcting result have a value 1. In that case, since all the digits in the decimal number part of the round-off result are 0, it is not necessary to shift the most significant digit having a value 1 to the position of the first digit of the integer part.

Figure 13:
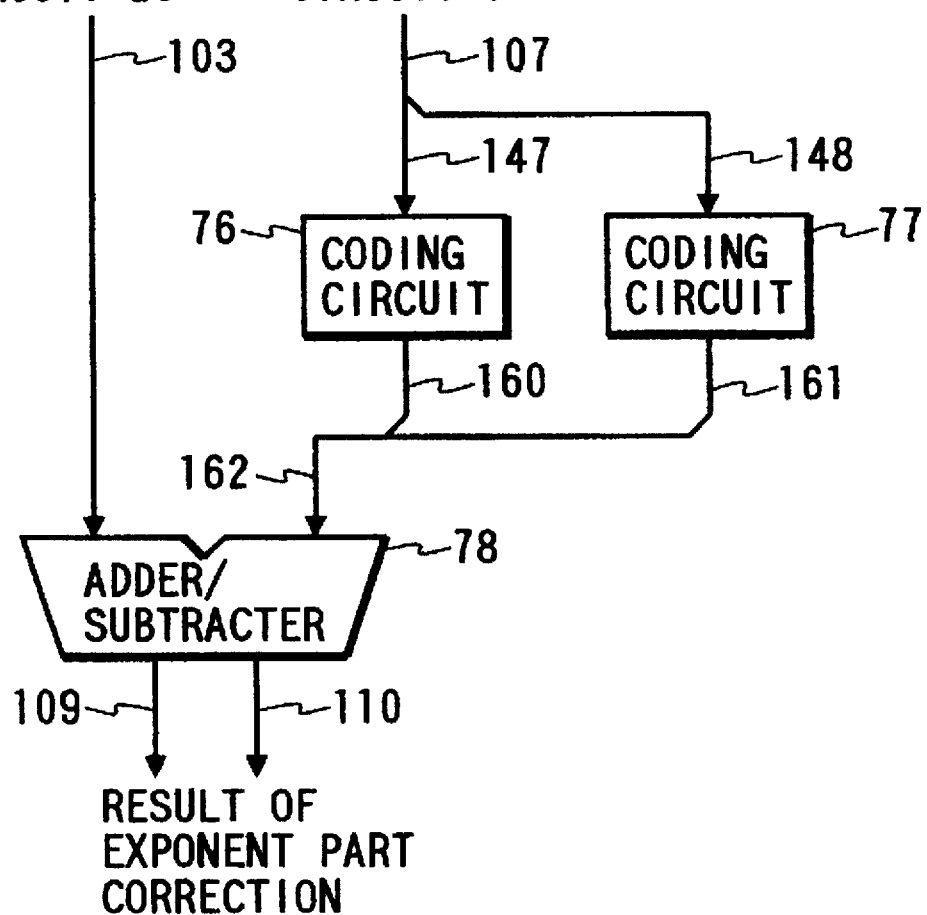
FIG. 13 is a block diagram of the exponent part correcting circuit 26 shown in FIG. 3.

Next, the exponent part correcting circuit 26 will be explained. FIG. 13 shows a block diagram of an example of the exponent part correcting circuit 26. The numeral 76 indicate a coding circuit which takes in the byte shift amount signal 147 of the shift amount predicting result 107 and codes it to a 3 bit signal 160. And, the numeral 77 indicates a coding circuit which takes in the bit shift amount signal 148 of the shift amount predicting result 107 and codes it to a 3 bit signal 161. By connecting the signal 161 to the lower side of the signal 160, the signal 162 representing the shift amount predicting result 107 by a binary number is generated. Then, an adder/subtracter 78 outputs a signal 109 obtained by subtracting the shift amount predicting signal 162 represented by a binary number from the exponent part 103 after the digit adjusting output from the exponent part calculating circuit 25, and a signal 110 is obtained by adding 1 to the signal 109.

Lastly, the exponent part selecting part 28 will be explained. The circuit 28 generates the exponent part signal of the floating-point calculation result by selecting the output signal 110 of the exponent part correcting circuit if the shift error detecting signal is 1 or the uppermost digit R1 of the round-off result is 1, otherwise the signal 109 to selected. By the above-explained processing, the sign, exponent part and mantissa part of the addition/subtraction result are obtained.

In Tables 3 and 4, in FIGS. 27 and 28 show concrete examples of the shift amount predicting result by the embodiment shown in FIG. 3. In either Table, the main signals in the process up to the time which the output 108 of the shifter for normalization 14 is obtained are shown in the case where the mantissa part 105 output from the digit adjusting shifter 11 is subtracted from the mantissa part 104 output from the operand swap circuit 10. Table 3 in FIG. 27 shows the case where the shift amount predicting result is correct, wherein the most significant digit having a value 1 of the result signal 106 of the adder/subtracter 12 is located at the first digit of the decimal number part, and the signals 147 and 148 composing the shift amount predicting signal have values of 0 and 1, respectively, that is, the shift amount predicting signal has a value 1. Therefore, the normalization shift result 108 is a normalized number. On the other hand, Table 4 in FIG. 28 shows the case where the shift amount predicting result is not correct, wherein the most significant digit having a value 1 of the result signal 106 of the adder/subtracter 12 is located at the first digit of the integer part, and the signals 147 and 148 composing the shift amount predicting signal have values of 0 and 1, respectively, that is, the shift amount predicting signal has a value 1. Therefore, the normalization shift result 108 is not a normalized number.

Figure 14:
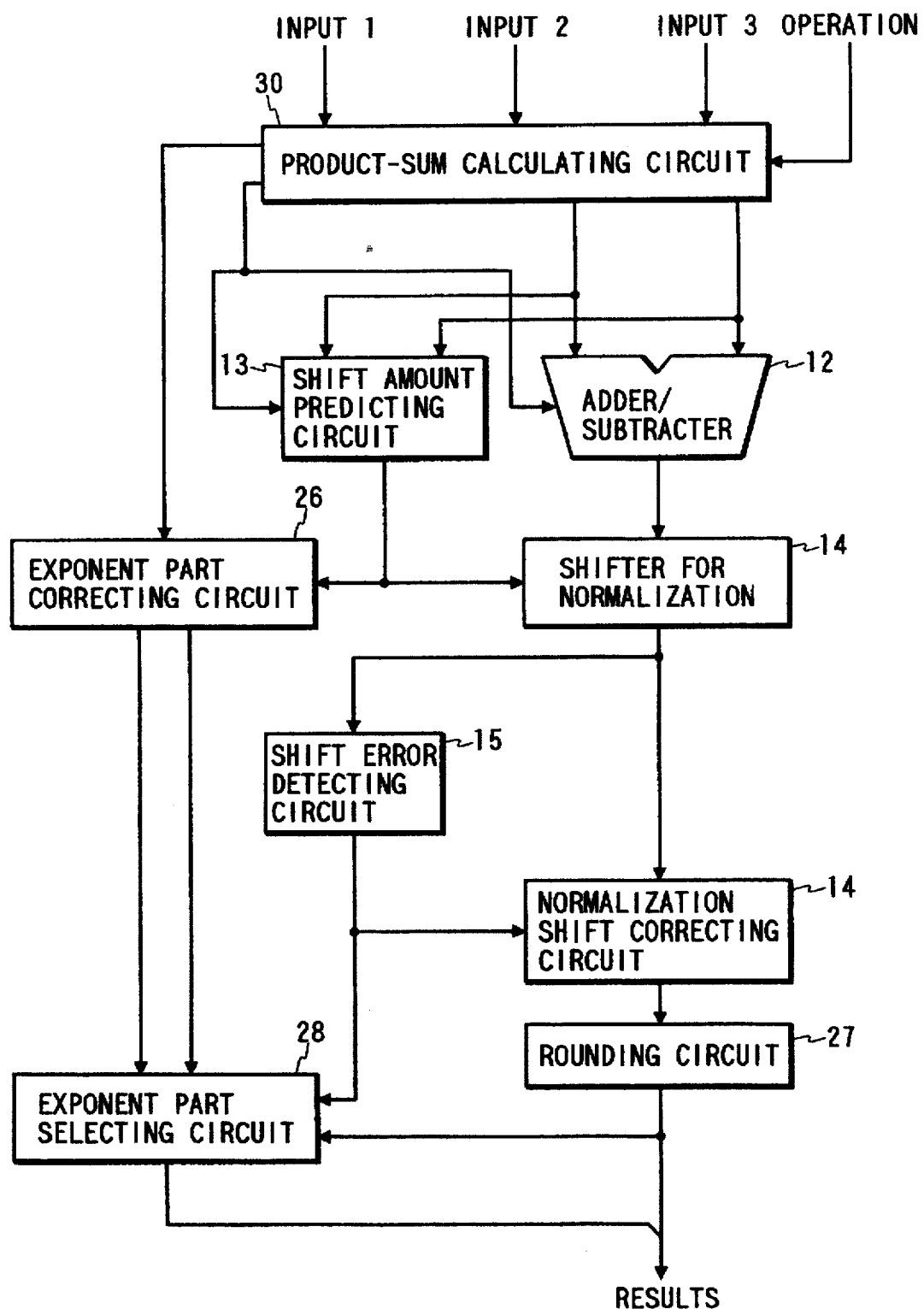
FIG. 14 is a block diagram of an example of a floating-point product-sum calculating circuit using the normalization shift predicting method of the present invention.

In FIG. 14, a block diagram of another embodiment of a floating-point product-sum calculating apparatus according to the present invention is shown. The apparatus takes in three input operands 1, 2 and 3, adds the input 3 to or subtracts the input 3 from the product of the inputs 1 and 2, and normalizes and rounds the addition/subtraction result. The different point of the apparatus shown by FIG. 14 from the apparatus shown in FIG. 3 is that the operand swap circuit 10 and the digit adjusting shifter 11 are replaced by a product-sum calculating circuit 80. For the two mantissa parts output from the product-sum calculating circuit 80, addition/subtraction is executed by the adder/subtracter 12, and the normalization shift amount prediction is effected by the shift amount predicting circuit 13. After the processing, the same processing as that by the embodiment shown in FIG. 3 is executed, and then the sign, exponent part and mantissa part of the product-sum are generated.

Figure 15:
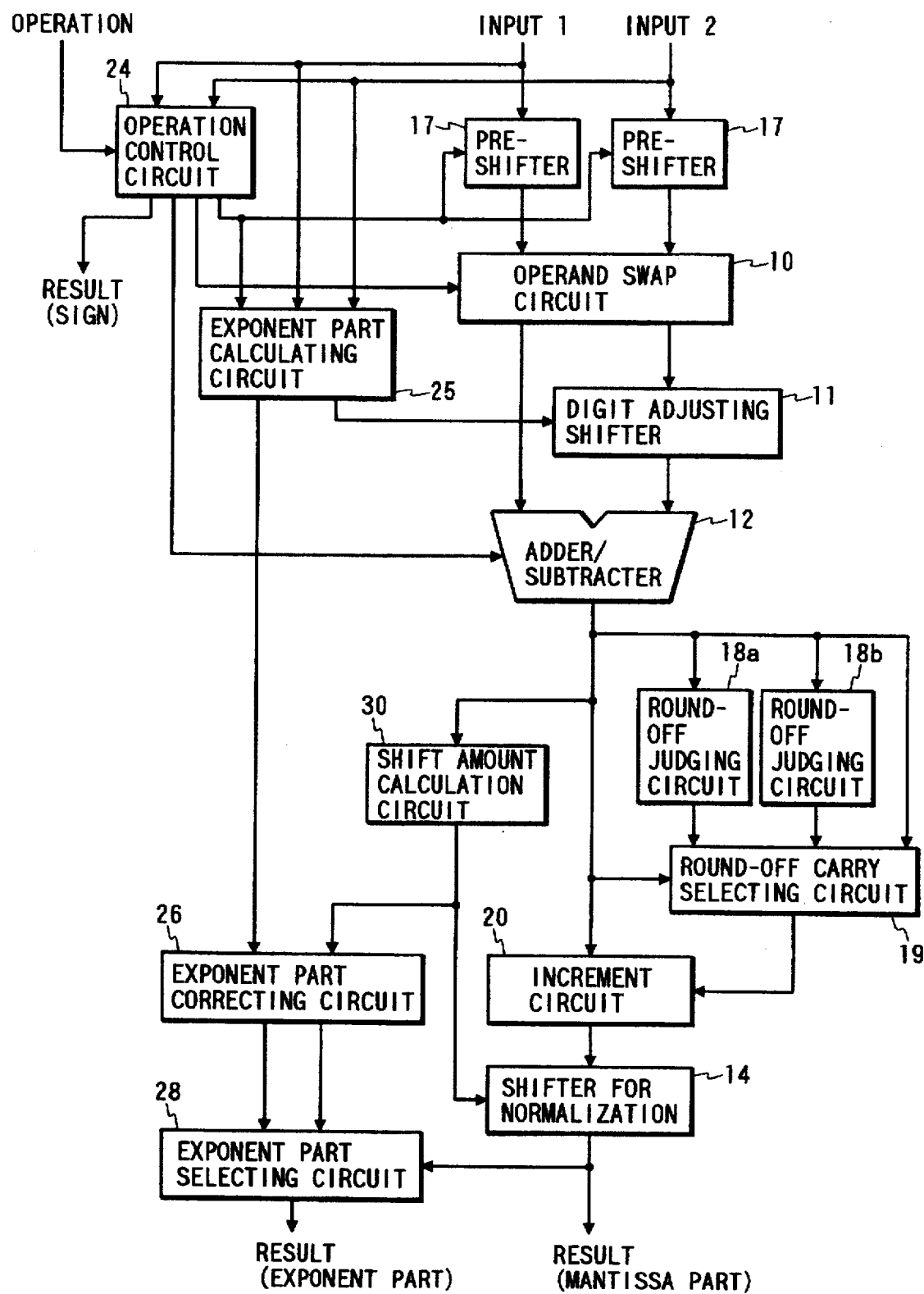
FIG. 15 is a block diagram of an example of a floating-point adder using the rounding before normalization method of the present invention.

In the following, an embodiment for executing a parallel processing of the normalization shift amount calculation and the round-off adjustment, which is the second object of the present invention, will be explained. FIG. 15 shows an example of the calculation apparatus for executing the same floating-point addition/subtraction processing as that executed by the calculation apparatus shown in FIG. 3.

The operation control circuit 24 generates the sign of a calculation result and control signals needed for the calculation, according to the instruction of addition or subtraction and according to the two input floating-point operands.

A pre-shifter 17 is one of the distinguishing parts of the present invention and shifts the mantissa part of the input operand by 1 digit in the lower direction in the effective addition.

The operand swap circuit 10 outputs the pre-shifted results separately as two data, namely, a mantissa part of an operand having a larger absolute value and a mantissa part of an operand having a smaller absolute value, based on the result of a comparison between the two absolute values of the input operands by the operation control circuit 24. The exponent part calculating circuit 25 outputs the difference between the two exponent parts and the value of the larger exponent part by comparing the two exponents. Then, in the effective addition, a value obtained by adding 1 to the larger exponent part is output.

The digit adjusting shifter 11 shifts the mantissa part of the operand having a smaller absolute value as output from the operand swap circuit 10 in the lower direction by using the difference between the two exponent parts output from the exponent part calculating circuit 25. Then, the value of the 55 th digit of the digit adjusting shift result is the logical OR of all data of lower digits from the 55 th digit.

The adder/subtracter 12 executes addition or subtraction for the mantissa part of the operand having a larger absolute value output from the operand swap circuit 10 and the output of the digit adjusting shifter 11. The shift amount calculating circuit 30 obtains the digit length from the most significant digit having a value 1 of the addition/subtraction result to the first digit of the integer part.

A round-off judging circuit 18a judges whether a carry by round-off occurs or not in case it is assumed that the most significant digit having a value 1 of the output of the adder/subtracter 12 is the first digit of the integer part. And, a round-off judging circuit 18b judges whether a carry by round-off occurs or not in case it is assumed that the most significant digit having a value 1 of the output of the adder/subtracter 12 is the first digit of the decimal number part. A round-off carry selecting circuit 19 detects the first digits of the integer and decimal number parts of the output of the adder/subtracter 12, and selects the output corresponding to the output of the adder/subtracter 12, from the two outputs of the round-off carry judging circuits 18a and 18b.

In the embodiment, the part composed of the round-off judging circuits 18a and 18b and the round-off carry selecting circuit 19 is a distinguishing part of the present invention. By referring to FIG. 18, methods of the round-off judging and the round-off carry selecting in the embodiment will be explained.

As shown in FIG. 18, the addition result A output from the adder/subtracter 12 is classified into three types of the above-mentioned two types and the type generating no carry, by noticing the position of the most significant digit having a value 1, in the embodiment.

The type 1 corresponds to the case wherein the value of the first digit of the integer part, and the lowest digit of the later-mentioned data format after the normalization shift is the 52 th digit (a52) of the decimal number part. In this case, the round-off judging is executed by using a52 and the data lower from it a53, a54 and a55. The data obtained by the round-off judging is a carry signal to a52 (c53). The round-off judging circuit 18a executes the above-mentioned round-off judgement, assuming the case of the type 1.

The type 2 corresponds to the case wherein a0 is "0" and a1 is "1", and the last digit of the later-mentioned data format after the normalization shift is the 53 th digit (a53) of the decimal number part. In this case, the round-off judging is executed by using a53 and the data lower from it a54 and a55. The data obtained by the round-off judging are a carry signal to a52 (c53) and a value (r53) obtained by rounding a53. The round-off judging circuit 18b executes the above-mentioned round-off judgement, assuming the case of the type 2.

The type 3 corresponds to the case wherein both of a0 and a1 are "0", and the last digit of the data format after the normalization shift is located at the digit below the 54 th digit of the decimal number part. As mentioned previously (refer to FIG. 20), since the digits lower than the 54 th digit of the decimal number part have a value 0, there does not exist data of value 1 exceeding the digit length of the data format. Therefore, in this case, the round-off adjusting is not executed and the carry signal c53 and the value r53 obtained by rounding a53 are output as "0".

Then, a concrete method of processing the round-off judgement is executed by using the data for round-off L, R and S (refer to FIG. 18) in accordance with one of the input round-off modes. For example, a method described in Japanese Patent Application Laid-Open 044048/1994 is applicable to the method of processing the round-off judgement in accordance with one of the round-off modes. In the embodiment, so far as the digit composition of the data used for the round-off processing by the round-off judging circuits 18a and 18b is one of those mentioned above, the concrete method of processing the round-off judgement is not restricted to a specific method. The round-off carry selecting circuit 19 judges which type of the above-mentioned three types the present addition result corresponds to, from the combination of a0 and a1 of the addition result. Then, the circuit 19 selects and outputs one of the three combination of the carry signal c53 and the round-off value r53, corresponding to the judgement result.

The increment circuit 20 takes in the data from the first digit of the integer data to the 52 th digit of the decimal number part, and outputs the value obtained by adding 1 to the 52 th digit of the input data if the carry signal output from the round-off carry selecting circuit 19 is 1, otherwise it outputs the addition result as it is.

In this embodiment, each of the two round-off judging circuits judges whether a carry to the lowest digit of the format occurs or not, and the increment circuit takes in the data to the lowest digit and executes the increment processing by adding 1 to the lowest digit of the format if a carry occurs. However, in accordance with the present invention, the position determined as the digit position to receive the carry in the round-off judging circuit and the digit length of the data input to the increment circuit is not restricted to the above-mentioned position or length.

For example, it is possible that a round-off judging circuit may have such a composition that judging the occurrence of a carry is executed by observing the digit plural digits above the lowest digit of the format, and the rounding of an addition result is executed by using the data from the above-mentioned digit to the lowest digit, and the judging and rounding results are output as a carry signal and a round-off value as explained in the embodiment. By such a composition, since the round-off value of the data from the lowest digit to the above-mentioned digit can be obtained in advance, the digit length of the data to be input to an increment circuit can be reduced.

The normalization shifter 14 shifts the output of the increment circuit 20 by using the shift amount output from the shift amount calculating circuit 30. The exponent part correcting circuit 26 calculates the value obtained by subtracting the shift amount output from the shift amount calculating circuit 30 from the larger exponent part value output from the exponent part calculating circuit 25 and the value obtained by adding 1 to the previously obtained value. The exponent selecting part 28 selects the larger value output from the exponent part correcting circuit 26 if the second digit of the integer part of the output of the increment circuit 20 has a value 1, that is, if all the values of the first digit of the integer part and the mantissa part are 0, otherwise it selects the smaller value, by taking in the two outputs of the exponent part correcting circuit 26. By the above-explained processing, the floating-point addition/subtraction result is generated.

In the embodiment, since the two input operands are shifted by 1 digit in the lower direction by the pre-shifters 17 in the effective addition, the cases in which round-off processing is to be executed are restricted to the two cases of the most significant digit having a value 1 of the addition/subtraction result being located at the first digit of the integer part and the first digit of the decimal number part. Therefore, it is possible that the round-off judging by using the values of the lowest several digits can be executed in advance by assuming the above-mentioned two cases before the most significant digit having a value 1 of the addition/subtraction result is known. Further, as soon as the values of the first digit of the integer part and the first digit of the decimal number part of the addition/subtraction are obtained, one of the two cases of a carry occurring and a carry not occurring due to the round-off operation will be determined, and the increment processing can be executed by using the round-off values obtained in advance.

In this embodiment, the round-off judging and the increment processing can be carried out in parallel with the shift amount calculation, which reduces sharply the computing time for the floating-point calculation.

Further, in this embodiment, since the number of cases in which the round-off processing is required for the addition/subtraction result can be reduced to 2, which requires only two round-off judging circuits, the total delay time of signal propagation can be further reduced as compared to the conventional apparatus.

Further, in this embodiment, the increase of hardware needed for realizing the high speed calculation processing can be kept to a small amount. More specifically, as compared with the conventional example shown in FIG. 24, only the pre-shifters, the round-off judging circuits and the round-off carry selecting circuit are newly added and the hardware increase can be suppressed by an amount smaller than 1% of the total hardware amount of the floating-point calculation apparatus.

Figure 19:
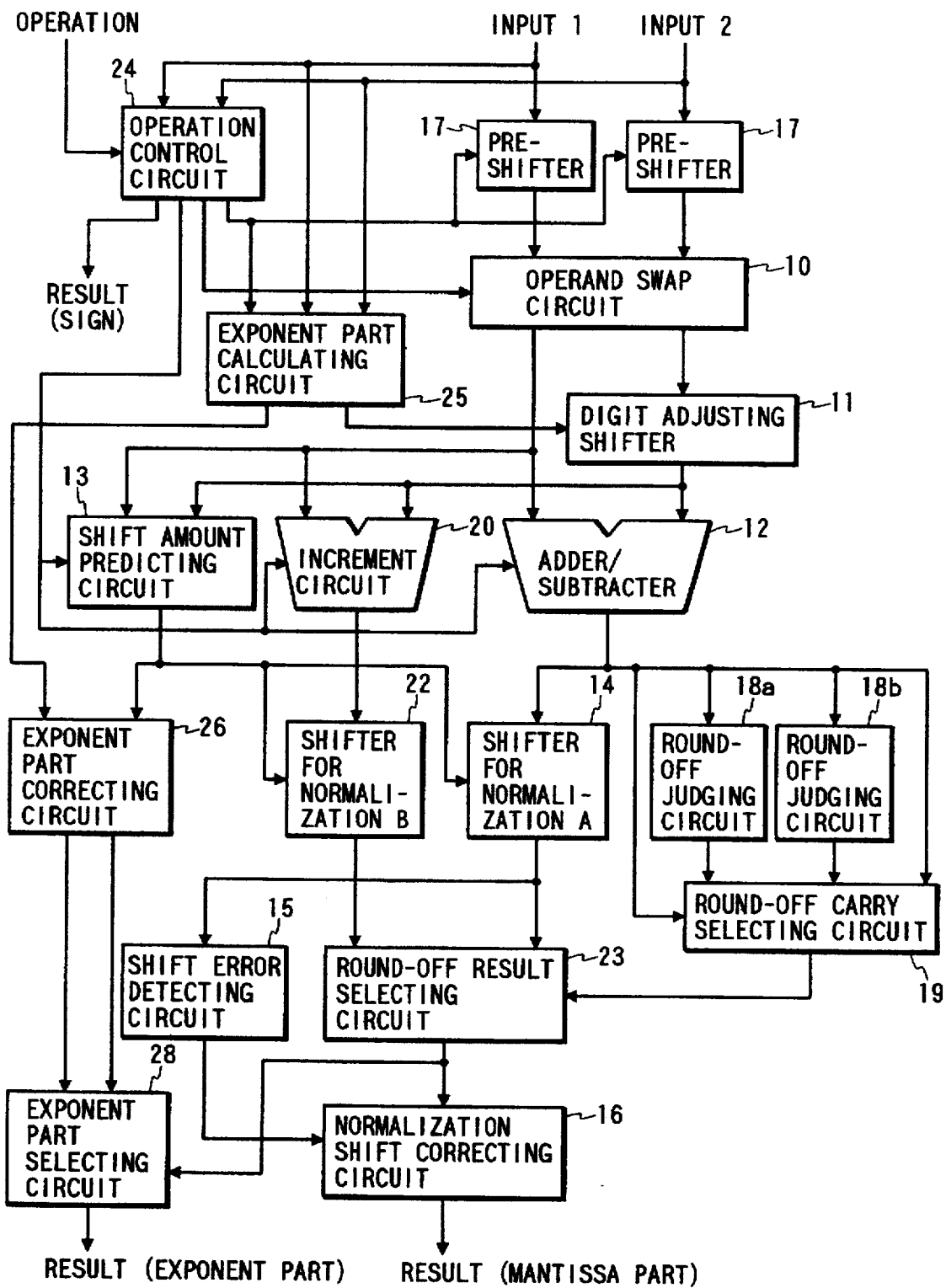
FIG. 19 is a block diagram of an example of a floating-point adder using the normalization shift amount predicting method and the rounding before normalization method, according to the present invention.

Lastly, an embodiment attaining the first and second objects of the present invention at the same time will be explained. FIG. 19 shows an example of a floating-point calculation apparatus of the type shown in FIGS. 3 and 15.

In FIG. 19, the processing, from the inputting of the operation instruction and the two operands to the calculation operations using the operation control circuit 24, the exponent part calculating circuit 25, the pre-shifters 17, the operand swap circuit 10, the digit adjusting shifter 11 and the adder/subtracter 12, is the same as that in the embodiment shown by FIG. 15.

The shift amount predicting circuit 13 takes in the two mantissas parts input to the adder/subtracter 12, and predicts the digit length from the most significant digit having a value 1 to the first digit of the integer part within an error of i bit.

The increment circuit 21 takes in the two mantissa parts input to the adder/subtracter 12, and adds 1 to the 52nd digit of the addition/subtraction results.

Then, by referring to FIG. 20, the processing methods executed in the adder/subtracter 12 and the increment circuit 20 are explained for each case of effective addition and effective subtraction.

In FIG. 20, the case (1) shows a method of effective addition by the adder/subtracter 12. M is the larger mantissa part output from the operand swap circuit 10, and m0 the value of the first digit of the integer part, and [m1 . . . m53] the values from the first digit to the 53rd digit of the decimal number part. Although the decimal number part of each input operand has the values of 52 digits, the signal M input to the adder/subtracter 12 has the values of 53 digits since the two operands are shifted by 1 digit in the lower direction in the effective addition. Then, N is the output of the digit adjusting shifter 11, and the signal n55 of the 55 th digit of N is the logical OR of the values of all the lower digits including the 55 th digit. By using the two mantissa parts M and N, the addition/subtraction result A is generated. Since m0 and n0 have "0", the digits above the first digit of the integer part of the addition/subtraction result do not have a value 1. Therefore, the addition and the subtraction result has the values at the first digit in the integer part and the 55 digits in the decimal number part.

The case (2) shows a method of effective subtraction by the adder/subtracter 12. In this case, the mantissa parts M and a complement of the mantissa part N to 1 are added, and 1 is further added to the value of the 55 th digit of the addition result. Then, the result has also the values at first digit in the integer part and the 55 digits in the decimal number part.

The case (3) shows a method of effective addition by the increment circuit 21. In this case, the mantissa parts M and the mantissa part N are added, and 1 is further added to the value of the 52nd digit of the addition result. Then, the values of the two digits of the integer parts iv and i0, and the values of the 52 digits of the decimal number part [i1 . . . i52] are used as the result of the increment.

The case (4) shows a method of effective subtraction by the increment circuit 21. In this case, the mantissa parts M and a complement of the mantissa part N to 1 are added, and 1 is further added to the value of the 52nd and 55 th digits of the addition result. Then, the values of the two digits of the integer parts iv and i0, and the values of the 52 digits of the decimal number part [i1 . . . i52] are used as the result of the increment.

Then, the normalization shifter 14 shifts the output of the adder/subtracter 12 by using the shift amount output from the shift mount predicting circuit 13. In like manner, the for normalization shifter 22 shifts the output of the increment circuit 21 by using the shift amount output from the shift amount predicting circuit 13. FIG. 21 shows the operations of the two shifters for normalization. In FIG. 21, the case (1) shows the situation of the normalization shift of the addition/subtraction result. The result J of the normalization shift is composed of the two digits of the integer part jv and j0, and the 51 digits of the decimal number part [j1 . . . j51], and has the values shown by the figure, corresponding to the shift amount. And the case (2) shows the situation of the normalization shift of the increment result. The result K of the normalization shift is composed of the two digits of the integer part kv and k0, and the 51 digits of the decimal number part [k1 . . . k51], and has the values shown by the figure, corresponding to the shift amount. As explained using FIG. 17, if the shift amount is not less than 2, the carry by round-off does not occur. Therefore, since the result of the increment is not selected if the shift amount is not less than 2, it is immaterial what the shift amount is. In the embodiment, if the normalization shift amount is not less than 1, that is, the shift amount is a value other than 1 a one bit shift is executed. By such a processing method, since the shifter has only to execute 0 or 1 bit shifting, a high speed shift operation becomes possible and the logic size of the calculation apparatus becomes smaller. The operations of the round-off judging circuits 18a and 18b, and the round-off carry selecting circuit 19 are the same as those in the embodiment shown in FIG. 15. A round-off result selecting circuit 23 takes in the carry signal output from the round-off carry selecting circuit 19, and selects the output of the normalization shifter 22 if a carry occurs, otherwise it selects the output of the normalization shifter 14. The second digit signal in the integer part of the output of the normalization shifter 14 is input to the shift error detecting circuit 15. If the signal has a value 0, since it means that the shift amount predicting is correctly executed, the normalization shift correcting circuit 16 outputs the result of the round-off selecting circuit 23 as the mantissa part of the addition/subtraction result. On the other hand, if the signal has a value 1, it means that the shift amount predicting is not correctly executed. Then, the normalization shift correcting circuit 16 shifts the output of the round-off result selecting circuit 23 by 1 digit in the lower direction, and outputs the shifted value.

The exponent part correcting circuit 26 calculates the value obtained by subtracting the shift amount output from the shift amount calculating circuit 30 from the larger exponent part output from the exponent part calculating circuit 25, and the value obtained by adding 1 to the previously obtained value. The exponent part selecting circuit 28 takes in the two outputs of the exponent part correcting circuit 26, and selects the larger exponent part output from the exponent part correcting circuit 26 if the second digit in the integer part of the output of the round-off result selecting circuit 23 has a value 1, that is, all the values of the first digit of the integer 25 part, and the digits of the mantissa part are "0", otherwise selects the smaller exponent part output from the exponent part correcting circuit 26. By the above-explained processing, the floating-point addition/subtraction result is generated.

In the following, the effects of the present invention will be explained by using FIGS. 22 and 23.

FIG. 22 is a figure for comparing the two critical paths of the operation, each of which is the main factor determining the computing time by the embodiment shown in FIG. 3 and the conventional apparatus shown in FIG. 24. In FIG. 22, the case (1) shows the critical path in the operation of the conventional apparatus. In FIG. 24, the output of the digit adjusting shifter 11 is set as the start point of the path, and the output of the normalization shifter 14 is set as the end point. In FIG. 22, the case (2) shows the critical path in the operation of the embodiment of the present invention. In FIG. 3, the output of the digit adjusting shifter 11 is set as the start point of the path, and the output of the normalization shift correcting circuit 16 is set as the end point. In the case (1) of FIG. 22, the addition/subtraction, the shift amount calculation are performed the normalization shift operation are successively carried out. On the contrary, in the case (2) of FIG. 22, the addition/subtraction and the shift amount calculation are performed in parallel, which sharply reduces the number of logic operation stages. Although the shift error correction and the normalization shift correction are newly added after the normalization shift operation, the total critical path is highly speeded up in the embodiment.

Figure 23:
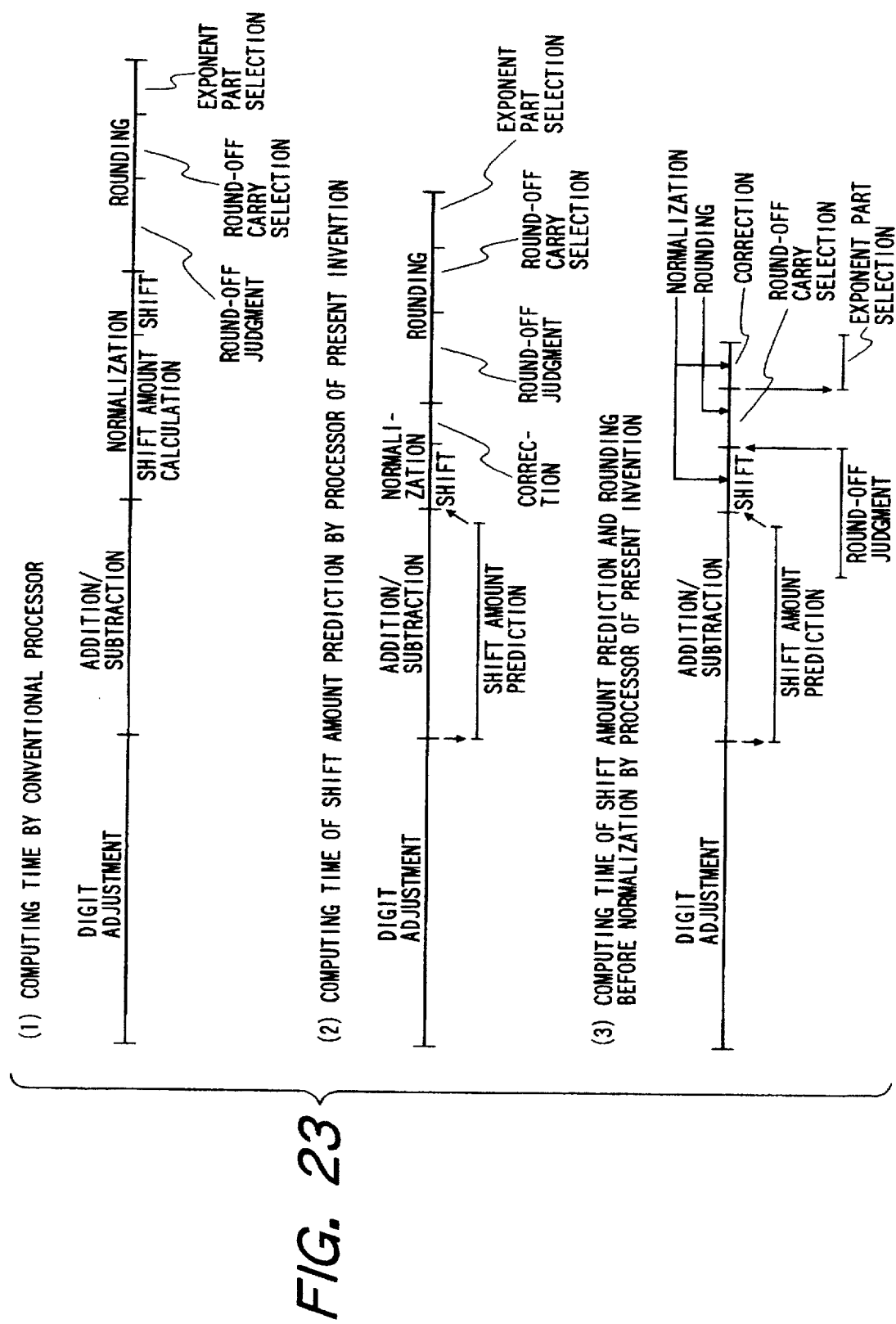
FIG. 23 is a diagram for comparing respective calculation times of the floating-point adder between a conventional apparatus and the embodiment of the present invention.

FIG. 23 is a figure for comparing the two computing times of the embodiment shown by FIG. 3 and the conventional apparatus shown by FIG. 24. The axis of abscissas indicates the computing time. The case (1) shows the computing time of the conventional calculation apparatus. The case (2) shows the computing time of the calculation apparatus to which the shift amount predicting method of the present invention is applied, and the time required for the normalization is reduced to a half or less of that of the conventional calculation apparatus since the shift amount calculation and the addition/subtraction can be processed in parallel. Thus, the computing time of the embodiment is speeded up by more than 30% as compared for the addition/subtraction and the normalization processing, and the overall time is speeded up by more than 15% for the total floating-point calculation processing. The case (3) shows the computing time of the calculation apparatus to which the rounding before normalization method of the present invention is further applied, and the time required for the rounding is effectively reduced by more than a half of that of the conventional calculation apparatus since the round-off judging can be processed in parallel with the addition/subtraction and the normalization shift. Processing If all the features of the present invention are applied to the calculation apparatus, the computing time required for the normalization and the rounding can be reduced approximately by 30% as compared with the conventional calculation apparatus, and a speed-up by more than 25% in the total floating-point calculation processing is obtained. Although the implementation of the present invention needs the additional hardware of the successive 0 detecting circuit in the shift amount predicting circuit, the normalization shift correcting circuit, the round-off judging circuit, the round-off carry selecting circuit and the shifter for normalization of the increment result, the number of the gates required for the additional hardware is 2–3% of the total floating-point adder/subtracter, and so the increase of the gate number can be suppressed to a small amount.

As mentioned previously, according to the present invention, since the case number needed for the round-off adjusting can be decreased from the conventional number 3 to 2, the computing time can be further reduced.

That is, since the position of the most significant digit having a value 1 of the effective addition result can be restricted to either the first digit of the integer part or the first digit of the decimal number part by obtaining the effective addition result as the value shifted by 1 digit in the lower direction, the case number needed for the round-off judging can be decreased to 2 cases also by regarding the effective subtraction case.

Obtaining the effective addition result as the value shifted by 1 digit in the lower direction can be easily realized by shifting the two mantissa parts by 1 digit in the lower direction in the digit adjusting processing before the addition. Then, although it is necessary to add 1 to the exponent parts, since the addition result is shifted by 1 digit in the lower direction, the increasing of the exponent parts by 1 can be realized by adding 1 to the exponent part selected in the digit adjusting, and the calculation can be speeded up.

As mentioned above, the parallel processing of the normalization shift amount calculation and the addition/subtraction becomes possible by predicting the normalization shift amount within an error of 1 bit by using the input operands to the adder/subtracter. Further, the correct normalization result can be generated by the shift error detecting and the normalization shift correcting operations.

Further, the incrementing of the outputs of the round-off judging circuit and the adder/subtracter can be processed in parallel with the normalization shift amount calculation, since the round-off judging can be executed in advance by using the addition/subtraction result before the normalization shifting processing.

What is claimed is:

1. An addition/subtraction processing apparatus for executing addition/subtraction of two floating-point operands, comprising:

a digit adjusting circuit for adjusting digits of a mantissa part of one of said two operands so that a value of one exponent part having a value smaller than a value of the other exponent part is conformed to said value of said other exponent part having a larger value;

an adder/subtracter for executing addition/subtraction of said two mantissa parts after said digit adjusting of said mantissa part;

an approximate shift amount predicting circuit for predicting a digit length from a digit representing the most significant digit having a value 1 to the uppermost digit of an addition/subtraction result expressed in a normalized form, within an error of 1 digit by using said two mantissa parts after the digit adjusting;

a normalization shifter for normalizing said addition/subtraction result to express said addition/subtraction result in a normalized form;

a shift error detecting circuit, responsive to the most significant digit having a value 1 differing from the uppermost digit of the normalized addition/subtraction result, for detecting the difference between said two digits; and a normalization shift correcting circuit for shifting said normalized addition/subtraction result, by from 0 to n digits;

wherein said addition/subtraction result produced by said adder/subtracter is shifted by said normalization shifter using a result produced by said approximate shift amount predicting circuit, is further shifted by said normalization shift correcting circuit using a result produced by said shift error detecting circuit, and is output as a normalized result.

2. An addition/subtraction processing apparatus for executing addition/subtraction of two floating-point operands according to claim 1, wherein said approximate shift amount predicting circuit predicts a digit length to be shifted, within an error of 1 digit, and said difference between said two digits detected by said shift error detecting circuit is corrected by one of 0 and 1 digit.

3. An addition/subtraction processing apparatus for executing addition/subtraction of two floating-point operands according to claim 1, wherein said approximate shift amount predicting circuit executes a logical XOR operation for each digit of two mantissa parts, using said two mantissa parts of a binary number after said digit adjusting as produced in an addition calculation, and using one of said two mantissa parts after said digit adjusting and after converting the one mantissa part to complement to 1 and the remaining mantissa part in a subtraction calculation, executes in a logical XOR operation on a result of said previous logical XOR operation and a result shifted by 1 digit in a lower digit direction for producing a logical OR operation result of said two mantissa parts, including said complement of said one mantissa part in a subtraction calculation, for each digit, and predicts a digit length of an amount to be shifted, by setting a digit length from the most significant digit having a value 1 to the uppermost digit of a result of said later logical XOR operation as said shift amount, and executing an error correction on said predicted shift amount by one of 0 and 1 digit.

4. An addition/subtraction processing apparatus for executing addition/subtraction of two floating-point operands, comprising:

a digit adjusting circuit for taking in said two floating-point operands, executing a comparison and a difference calculation on two exponent parts of said operands, and shifting a mantissa part of an operand having an exponent part of a value smaller than an exponent part of the other operand, by a difference between the values of the two exponent parts of said operands, in a lower digit direction;

an adder/subtracter for executing addition/subtraction of the two mantissa parts after said digit adjusting, by referring to signs of said two operands and an instruction signal for designating one of addition and subtraction;

a normalization shifter for shifting a result of said addition/subtraction so that the most significant digit having a value 1 of said result of said addition/subtraction is located at the uppermost digit of a normalized format;

a rounding circuit, responsive to a digit length of a result produced by said normalization shifter exceeding a predetermined digit length in said normalized format, for rounding values of digits exceeding said predetermined digit length in a result produced by said normalization shifter;

an approximate shift amount predicting circuit for predicting a digit length from the most significant digit having a value 1 to the uppermost digit of an addition/subtraction result expressed in a normalized form, within an error of 1 digit, using said two mantissa parts after the digit adjusting;

a shift error detecting circuit, responsive to the most significant digit having a value 1 differing from the uppermost digit of a normalized result after said normalizing by said normalization shifter, for detecting the difference between said two digits; and a normalization shift correcting circuit for shifting a result produced by said normalization shifter by form 0 to n digits;

wherein said addition/subtraction result produced by said adder/subtracter is shifted by said normalization shifter using a result produced by said approximate shift amount predicting circuit, is further shifted by said normalization shift correcting circuit using a result produced by said shift error detecting circuit, and is output as a normalized result.

5. An addition/subtraction processing apparatus for executing addition/subtraction of two floating-point operands according to claim 4, wherein said approximate shift amount predicting circuit predicts a digit length to be shifted, within an error of 1 digit, and said difference between said two digits as detected by said shift error detecting circuit is corrected by one of 0 and 1 digit.

6. An addition/subtraction processing apparatus for executing addition/subtraction of two floating-point operands according to claim 3, wherein said approximate shift amount predicting circuit executes a logical XOR operation for each digit of two mantissa parts, using said two mantissa parts after said digit adjusting as produced in an addition calculation, and using one of said two mantissa parts after said digit adjusting and after converting the one mantissa part to a complement to 1 and the remaining mantissa part in a subtraction calculation, executes a logical XOR operation on a result of said previous logical XOR operation and a result shifted by 1 digit in a lower digit direction for producing a logical OR operation result of said two mantissa parts, including said complement of said one mantissa part in a subtraction calculation, for each digit, and predicts a digit length of an amount to be shifted, by setting a digit length from the most significant digit having a value 1 to the uppermost digit of a result of said later logical XOR operation as said shift amount, and executing an error correction on said predicted shift amount by one of 0 and 1 digit.

7. A floating-point product-sum calculation processing apparatus, comprising:

a product-sum calculating circuit for taking in three floating-point operands, calculating a product of two of said three operands, executing a comparison and a difference calculation between the two exponent parts of a result of said product and a remaining third operand, and shifting a mantissa part of an operand having an exponent part of a value smaller than a value of an exponent part of the other operand, in the two operands representing said result of said product and said remaining third operand, by said difference between values of the two exponent parts of said two operands, in a lower digit direction;

an adder/subtracter for executing addition/subtraction of two mantissa parts after said product-sum calculating by referring to signs of said two operands representing said result of said product and said remaining third operand and an instruction signal for designating one of addition and subtraction;

a normalization shifter for shifting a result of said addition/subtraction so that the most significant digit having a value 1 of said result of said addition/subtraction is located at the uppermost digit of a normalized format;

a rounding circuit, responsive to the digit length of a result produced by said normalization shifter exceeding a predetermined digit length in said normalized format, for rounding values of digits exceeding said predetermined digit length in the result produced by said normalization shifter;

an approximate shift amount predicting circuit for predicting a digit length from the most significant digit having a value 1 to the uppermost digit of an addition/subtraction result expressed in a normalized form, within an error of 1 digit, using said two mantissa parts after said product-sum calculating;

a shift error detecting circuit, responsive to the most significant digit having a value 1 differing from the uppermost digit of said normalized result after said normalizing by said normalization shifter, for detecting said difference between said two digits; and a normalization shift correcting circuit for shifting a result produced by said shifter by form 0 to n digits;

wherein said addition/subtraction result produced by said adder/subtracter is shifted by said normalization shifter using a result produced by said approximate shift amount predicting circuit, is further shifted by said normalization shift correcting circuit using a result produced by said shift error detecting circuit, and is output as a normalized result.

8. A floating-point product-sum calculation processing apparatus according to claim 7, wherein said approximate shift amount predicting circuit predicts a digit length to be shifted, within an error of 1 digit, and said difference between said two digit detected by said shift error detecting circuit is corrected by one of 0 and 1 digit.

9. A floating-point product-sum calculation processing apparatus according to claim 5, wherein said approximate shift amount predicting circuit executes a logical XOR operation for each digit of two mantissa parts, using said two mantissa parts after said product-sum calculating as produced in an addition calculation, and using one of said two mantissa parts after said product-sum calculating and after converting the one mantissa part to a complement to 1 and the remaining mantissa part in a subtraction calculation, executes a logical XOR operation on a result of said previous logical XOR operation and a result shifted by 1 digit in a lower digit direction for producing a logical OR operation result of said two mantissa parts, including said complement of said one mantissa part in a subtraction calculation, for each digit, and predicts a digit length of an amount to be shifted by setting a digit length from the most significant digit having a value 1 to the uppermost digit of a result of said later logical XOR operation as said shift amount, and executing an error correction on said predicted shift amount by one of 0 and 1 digit.

10. An addition/subtraction processing apparatus for executing addition/subtraction of two floating-point operands, comprising:

a pre-shifter for shifting mantissa parts of said two floating-point operands by one digit in a lower digit direction in effective addition, and outputting said two mantissa parts as they are, without digit shifting, in effective subtraction;

a digit adjusting circuit for adjusting digits between said two floating-point operands;

an adder/subtracter for executing addition processing of said two operands in effective addition and subtraction processing of two operands in effective subtraction;

a first round-off judging circuit for judging occurrence of a carry in a round-off operation and outputting information on said carry occurrence, using data of digits below a lowest digit of a prescribed format in a result of said addition/subtraction;

a second round-off judging circuit for judging occurrence of a carry in a round-off operation and outputting information on said carry occurrence, using data of digits below a position lower by 1 digit than said lowest digit of said prescribed format in said result of said addition/subtraction;

a round-off selecting circuit for detecting the most significant digit having a value 1 in said result of said addition/subtraction, for selecting and outputting an output of said first round-off judging circuit if said most significant digit is located at a first digit position of an integer part, and for selecting and outputting an output of said second round-off judging circuit if said most significant digit is located at a first digit position of a decimal number part;

a rounding circuit for executing a round-off operation on said result of said addition/subtraction in accordance with an output of said round-off selecting circuit; and a normalization circuit for executing a shift for normalization of said result of said addition/subtraction in accordance with an output of said round-off selecting circuit.

11. An addition/subtraction processing apparatus for executing addition/subtraction of two floating-point operands according to claim 10, wherein a unit composed of said rounding circuit and said normalization circuit, includes:

an increment circuit for adding 1 to said lowest digit of said prescribed format in said result of said addition/subtraction if a signal output from said round-off selection circuit indicates a carry occurrence;

a shift amount calculating circuit for calculating a digit length from said most significant digit having a value 1 to said first digit of said integer part of said result of said addition/subtraction; and a normalization shifter for shifting an output of said increment circuit using an output of said shift amount calculating circuit as a shift amount;

wherein, after said result of said addition/subtraction is obtained, processing by said first and second round-off judging circuits, said round-off selecting circuit and said increment circuit is executed in parallel with processing by said shift amount calculating circuit.

12. An addition/subtraction processing apparatus for executing addition/subtraction of two floating-point operands, comprising:

an operation control circuit for determining one of the operations of effective addition and effective subtraction to be carried out, corresponding to signs of said two input floating-point operands and an instruction signal for designating one of said operations;

pre-shifters for shifting mantissas parts of said two floating-point operands by 1 digit in a lower digit direction, if it is determined that effective addition is to be executed, and for outputting said two mantissa parts as they are, without shift, if it is determined that effective subtraction is to be executed;

an operand swap circuit for comparing absolute values of said two floating-point operands and for outputting said mantissa parts of said two operands by separating said mantissa parts into a part of an operand having a larger absolute value and a part of an operand having a smaller absolute value;

an exponent part calculating circuit for outputting a difference between two exponent parts of said operands, and a value obtained by adding 1 to an exponent part of the operand having a larger absolute value in effective addition and a value of said exponent part of said operand having a larger absolute value as it is in effective subtraction, as a common exponent value;

a digit adjusting circuit for shifting the mantissa part of said operand having a smaller absolute value output from said operand swap circuit by said difference between said two exponent parts in a lower digit direction;

an adder/subtracter for taking in two data consisting of said mantissa part of said operand having a larger absolute value output from said operand swap circuit and an output of said digit adjusting circuit, and for executing an addition operation on said two data in effective addition, and subtraction of said two data in effective subtraction;

a shift amount calculating circuit for taking in a result of said addition/subtraction, and for obtaining a digit length from the most significant digit having a value 1 to the first digit of an integer part of said result;

two round-off judging circuits for taking in said result of said addition/subtraction, and for respectively determining the occurrence of a carry at a prescribed round-off digit position for each of two cases, including a case in which said most significant digit having a value 1 is located at said first digit position of said integer part and a case in which said most significant digit is located at a first digit position of a decimal number part of said result;

a round-off selecting circuit for taking in said result of said addition/subtraction, for detecting said most significant digit having a value 1 of said result, and for outputting a signal from a corresponding one of said two round-off judging circuits, if said most significant digit having a value 1 is located at one of said first digit of said integer part and said first digit of said decimal number part, otherwise judging that there is not a carry occurrence at round-off;

an increment circuit for adding 1 at the lowest digit of a prescribed format in said result of said addition/subtraction if an output of said round-off selecting circuit indicates a carry occurrence by round-off;

a normalizing shifter for shifting an output of said increment circuit by a value output as a shift amount by said shift amount calculating circuit; and an exponent part correcting circuit for subtracting said shift amount output from said shift amount calculating circuit from said common exponent value output from said exponent part calculating circuit, and for adding 1 to a result of said subtraction if a second digit of an integer part of said output of said increment circuit has a value 1.

13. A method of executing addition/subtraction of two floating-point operands, comprising the steps of:

shifting each of the mantissa parts of said two floating-point operands by 1 digit in a lower digit direction in effective addition;

adding said two mantissa parts after executing a digit adjusting operation for said two shifted mantissa parts;

judging occurrence of a carry due to a round-off operation in advance for each of two cases, including a case in which a carry occurrence is judged using a first data group composed of digits below a lowest digit of a prescribed format in a result of said addition and a case in which a carry occurrence is judged using a second data group composed of digits below a digit lower by 1 digit than said lowest digit of said prescribed format in said result of said addition; and rounding and normalizing said result of said addition, using a result of said judging based on said first data group if the most significant digit having a value 1 is located at a first digit of an integer part of said result of said addition, and using a result of said judging based on said second data group if the most significant digit having a value 1 is located at a first digit of a decimal number part of said result of said addition.

14. A method of executing addition/subtraction of two floating-point operands, comprising:

an operation control step of determining one of the operations of effective addition and effective subtraction to be carried out, corresponding to signs of said two input floating-point operands and an instruction signal for designating one of said operations;

a pre-shifting step of shifting mantissas parts of said two floating-point operands by 1 digit in a lower digit direction, if it is determined that effective addition is to be executed, and for outputting said two mantissa parts as they are without shift, if it is determined that effective subtraction is to be executed;

an operand swap step of comparing absolute values of said two floating-point operands and outputting said mantissa parts of said two operands by separating said mantissa parts into a part of an operand having a larger absolute value and a part of an operand having a smaller absolute value;

an exponent part calculating step of outputting a difference between two exponent parts of said operands, and a value obtained by adding 1 to an exponent part of the operand having a larger absolute value in effective addition and a value of said exponent part of said operand having a larger absolute value as it is in effective subtraction, as a common exponent value;

a digit adjusting step of shifting the mantissa part of said operand having a smaller absolute value obtained by said operand swap step, by said difference between said two exponent parts in a lower digit difference;

an addition/subtraction step of taking in two data consisting of said mantissa part of said operand having a larger absolute value obtained by said operand swap step and a result obtained by said digit adjusting step, and executing an addition operation on said two data in effective addition, and subtraction of said two data in effective subtraction;

a shift amount calculating step of taking in a result of said addition/subtraction, and obtaining a digit length from the most significant digit having a value 1 to the first digit of an integer part of said result;

a round-off judging step of taking in said result of said addition/subtraction, and determining occurrence of a carry at a prescribed round-off digit position for each of two cases, including a case in which said most significant digit having a value 1 is located at said first digit position of said integer part and a case in which said most significant digit is located at a first digit position of a decimal number part of said result;

a round-off selecting step of taking in said result of said addition/subtraction, detecting said most significant digit having a value 1 of said result, and outputting a signal for a corresponding one of said two cases in said round-off judging step, if said most significant digit having a value 1 is located at one of said first digit of said integer part and said first digit of said decimal number part, otherwise judging that there is not a carry occurrence at round-off;

an increment step of adding 1 at the lowest digit of a prescribed format in said result of said addition/subtraction if a result obtained by said round-off selecting step indicates a carry occurrence by round-off;

a normalizing shifting step of shifting a result obtained by said increment step by a result value as a shift amount obtained by said shift amount calculating step; and an exponent part correcting step of subtracting said shift amount obtained by said shift amount calculating step from said common exponent value obtained by said exponent part calculating step, and adding 1 to a result of said subtraction if a second digit of an integer part of said result obtained by said increment step has a value 1.

15. An addition/subtraction processing apparatus for executing addition/subtraction of two floating-point operands, comprising:

an operand swap circuit for comparing absolute values of said two floating-point operands, and for outputting said mantissa parts of said two operands by separating said mantissa parts into a part of an operand having a larger absolute value and a part of an operand having a smaller absolute value;

an exponent part calculation circuit for outputting a difference between of exponent parts of said two floating-point operands, and an exponent part of the operand having a larger absolute value, as a common exponent value;

a digit adjusting circuit for shifting said mantissa part of said operand having a larger absolute value output from said operand swap circuit, by said difference between said two exponent parts output from said exponent calculating circuit in a lower digit direction;

an adder/subtracter for taking in two data consisting of said mantissa part of said operand having a larger absolute value output from said operand swap circuit and a result output from said digit adjusting circuit, and for executing an addition/subtraction operation on said two data;

an increment circuit for taking in said two data consisting of said mantissa part of said operand having a larger absolute value output from said operand swap circuit and a result output from said digit adjusting circuit, and for obtaining a value calculated by adding 1 at a prescribed digit of a result of said addition/subtraction operation;

an approximate shift amount predicting circuit for taking in said two data consisting of said mantissa part of said operand having a larger absolute value output from said operand swap circuit and a result output from said digit adjusting circuit, and for predicting a digit length from the most significant digit having a value 1 to a first digit of an integer part of said result of said addition/subtraction result within an error of 1 digit;

a first normalization shifter for shifting said result of said addition/subtraction, so that said most significant digit having a value 1 of said result of said addition/subtraction moves to a position of said first digit of said integer part, by a shift amount of said digit length output from said approximate shift amount predicting circuit;

a second normalization shifter for shifting said result output from said increment circuit by said shift amount of said digit length output from said approximate shift amount predicting circuit;

round-off judging circuits for taking in said result of said addition/subtraction, for rounding said result for prescribed digits, for obtaining a round-off result of data of digits from a lowest digit to a digit lower by 1 digit than the lowest digit for each of said prescribed digits of said taken in result, said each of said prescribed digits corresponding to a lowest digit of a result obtained by said increment circuit, and a carry by round-off to said each of said prescribed digits of said result of said taken in result, for each of said all prescribed digits, and for selecting a correct round-off result and a correct carry of said obtained round-off results and carries by using values of the uppermost two digits of said taken in result;

a round-off selecting circuit for selecting an output of said first normalization shifter, if a carry to said lowest digit in a result obtained by said increment circuit does not occur, and for selecting an output of said second normalization shifter, if a carry to said lowest digit in a result obtained by said increment circuit occurs, based on outputs of said round-off judging circuits;

a shift error detecting circuit for detecting a shift error as a difference between the positions of the most significant digit having a value 1 and a first digit of an integer part, in said output of said first normalization shifter;

a normalization shift correcting circuit for shifting an output of said round-off selecting circuit by 1 digit if a shift error is detected;

an exponent part correcting circuit for obtaining a value calculated by subtracting said shift amount from said common exponent value, and a value calculated by adding 1 to result of said subtraction; and an exponent part selecting circuit for selecting the larger value of two values output from said exponent part correcting circuit, if a second digit of an integer part in a result of said round-off selecting circuit has a value 1, otherwise selecting the smaller value of two values output from said exponent part correcting circuit.

* * * * *